US010136054B2

(12) United States Patent
Sawai et al.

(10) Patent No.: US 10,136,054 B2
(45) Date of Patent: Nov. 20, 2018

(54) IMAGE PROCESSING DEVICE FOR COMPOSITING PANORAMIC IMAGES, IMAGE PROCESSING PROGRAM AND RECORDING MEDIUM

(71) Applicant: Morpho, Inc., Bunkyo-ku, Tokyo (JP)

(72) Inventors: Shogo Sawai, Bunkyo-ku (JP); Masaki Hiraga, Bunkyo-ku (JP); Takeshi Miura, Bunkyo-ku (JP)

(73) Assignee: Morpho, Inc., Chiyoda-ku, Tokyo (JP)

( * ) Notice: Subject to any disclaimer, the term of this patent is extended or adjusted under 35 U.S.C. 154(b) by 387 days.

(21) Appl. No.: 14/233,294

(22) PCT Filed: Oct. 24, 2012

(86) PCT No.: PCT/JP2012/077491
§ 371 (c)(1),
(2) Date: Jan. 16, 2014

(87) PCT Pub. No.: WO2014/064783
PCT Pub. Date: May 1, 2014

(65) Prior Publication Data
US 2015/0229840 A1    Aug. 13, 2015

(51) Int. Cl.
*H04N 5/232* (2006.01)
*H04N 5/262* (2006.01)
(Continued)

(52) U.S. Cl.
CPC ....... *H04N 5/23238* (2013.01); *G06T 3/0068* (2013.01); *G06T 3/4038* (2013.01);
(Continued)

(58) Field of Classification Search
None
See application file for complete search history.

(56) References Cited

U.S. PATENT DOCUMENTS 6,075,905 A * 6/2000 Herman .................... G06K 9/32
348/588
6,078,701 A * 6/2000 Hsu .......................... G06K 9/32
375/E7.086
(Continued)

FOREIGN PATENT DOCUMENTS

CN  101606384 A  12/2009
CN  101656840 A   2/2010
(Continued)

OTHER PUBLICATIONS

Notice of Allowance issued by Japanese Patent Office in Japanese Application No. 2013-513456 dated Jan. 7, 2014.
(Continued)

*Primary Examiner* — Joseph G Ustaris
*Assistant Examiner* — William Adrovel
(74) *Attorney, Agent, or Firm* — Sughrue Mion, PLLC

(57) ABSTRACT

An image processing device includes an input unit, a selection unit, a matching unit, an estimation unit and a merging unit. The input unit sequentially inputs images. The selection unit selects a reference image from among the input images. The matching unit calculates a correspondence relationship between a feature point of the reference image and a feature point of a target image. The estimation unit estimates an equation that causes a coordinate system of the reference image to correspond to a coordinate system of the target image using positional information of a pair of the feature points whose correspondence relationship has been calculated by the matching unit by regarding a motion between the reference image and the target image as only a rotational motion of the imaging element. The merging unit merges the input image and the target image to generate the composite image based on the equation.

8 Claims, 16 Drawing Sheets

(51) Int. Cl.
*G01C 11/02* (2006.01)
*G06T 1/00* (2006.01)
*G06T 3/00* (2006.01)
*G06T 3/40* (2006.01)
*G06T 7/33* (2017.01)
*G06T 7/38* (2017.01)
*G06K 9/20* (2006.01)

(52) U.S. Cl.
CPC ........... *G06T 7/33* (2017.01); *H04N 5/23232* (2013.01); *H04N 5/23293* (2013.01); *H04N 5/2628* (2013.01); *G01C 11/02* (2013.01); *G06K 2009/2045* (2013.01); *G06T 1/0007* (2013.01); *G06T 7/38* (2017.01); *G06T 2200/32* (2013.01); *G06T 2207/10004* (2013.01); *G06T 2207/20221* (2013.01); *G06T 2210/44* (2013.01); *H04N 5/23222* (2013.01)

(56) References Cited

U.S. PATENT DOCUMENTS

| | | | |
|---|---|---|---|
| 6,104,840 A | 8/2000 | Ejiri et al. | |
| 6,657,667 B1* | 12/2003 | Anderson | H04N 5/23238 348/333.11 |
| 6,891,561 B1* | 5/2005 | Achituv | H04N 5/2624 348/36 |
| 7,424,218 B2* | 9/2008 | Baudisch | G03B 13/02 348/218.1 |
| 8,588,546 B2* | 11/2013 | Habuka | H04N 1/3876 348/36 |
| 8,848,034 B2* | 9/2014 | Fukuzawa | G03B 17/28 348/36 |
| 9,325,861 B1* | 4/2016 | Ettinger | H04N 1/00183 |
| 2003/0025803 A1* | 2/2003 | Nakamura | H04N 5/23203 348/218.1 |
| 2005/0168594 A1* | 8/2005 | Larson | G06T 3/4038 348/222.1 |
| 2007/0172151 A1* | 7/2007 | Gennetten | H04N 5/232 382/299 |
| 2008/0143745 A1* | 6/2008 | Jin | G06T 3/4038 345/629 |
| 2009/0021576 A1* | 1/2009 | Linder | G03B 37/00 348/36 |
| 2010/0054627 A1* | 3/2010 | Rosenberg | G06T 3/4038 382/284 |
| 2010/0054628 A1* | 3/2010 | Levy | G06T 3/4038 382/284 |
| 2011/0141227 A1* | 6/2011 | Bigioi | H04N 13/0007 348/36 |
| 2011/0228044 A1* | 9/2011 | Miyamoto | H04N 5/23222 348/36 |
| 2011/0304687 A1* | 12/2011 | Joshi | H04N 5/23238 348/36 |
| 2013/0033567 A1* | 2/2013 | Jeong | G03B 37/04 348/36 |
| 2013/0093840 A1* | 4/2013 | Ichikawa | H04N 5/23232 348/36 |
| 2013/0329072 A1* | 12/2013 | Zhou | G06T 3/4038 348/222.1 |

FOREIGN PATENT DOCUMENTS

| | | |
|---|---|---|
| CN | 101963751 A | 2/2011 |
| CN | 101984463 A | 3/2011 |
| JP | 11-73492 A | 3/1999 |
| JP | 2001-104137 A | 4/2001 |
| JP | 2001-250114 A | 9/2001 |
| JP | 2002-42125 A | 2/2002 |
| JP | 2009-60278 A | 3/2009 |
| JP | 2011-104137 A | 6/2011 |

OTHER PUBLICATIONS

International Search Repot for PCT/JP2012/077491 dated Dec. 25, 2012.

International Preliminary Report on Patentability dated May 7, 2015 from the International Bureau in counterpart International Application No. PCT/JP2012/077491.

Communication dated Nov. 2, 2016, issued by the State Intellectual Property Office of the P.R.C. in counterpart Chinese Application No. 201280072705.3.

* cited by examiner

Fig.5
(A)
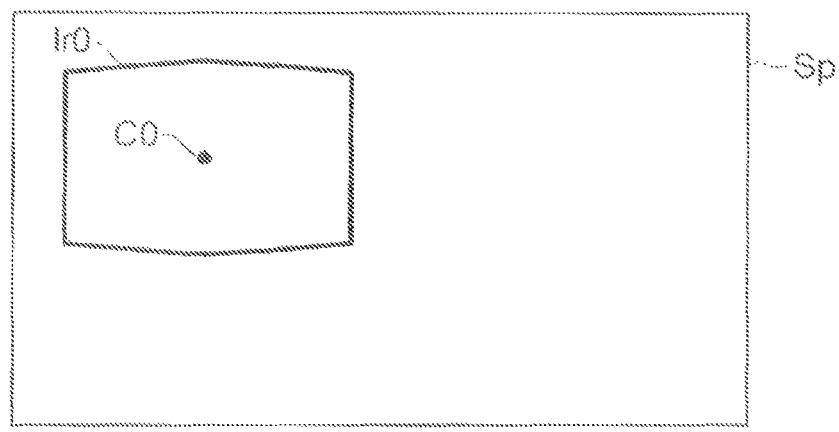
(B)
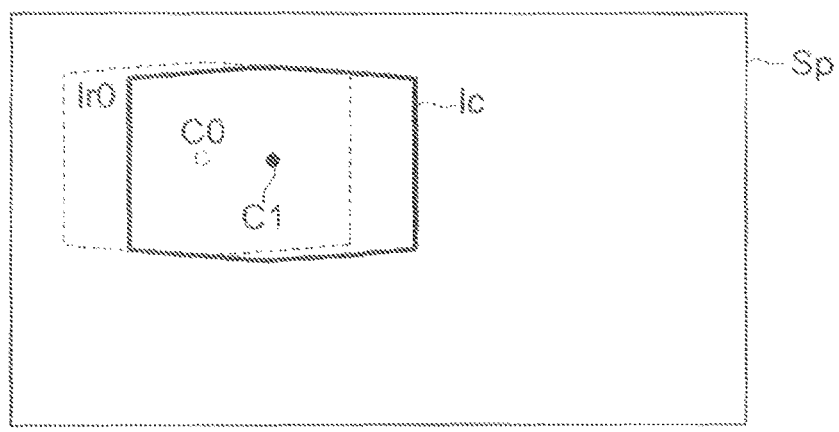
(C)
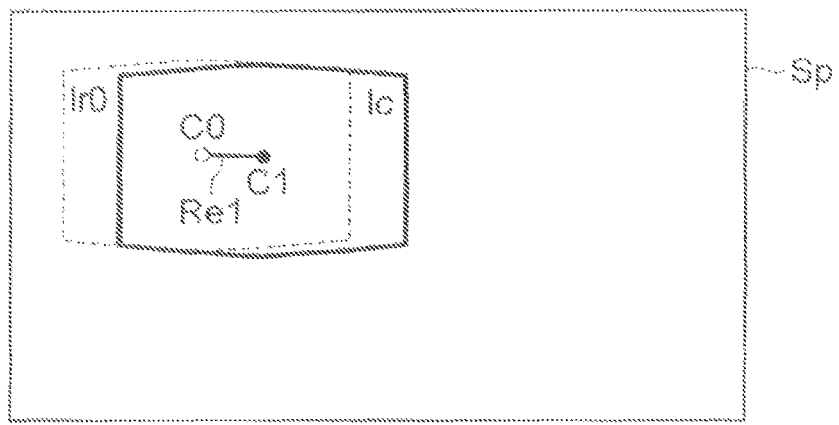

Fig.8
(A)
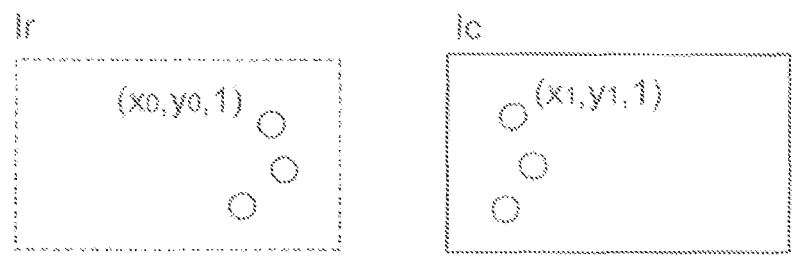
(B)
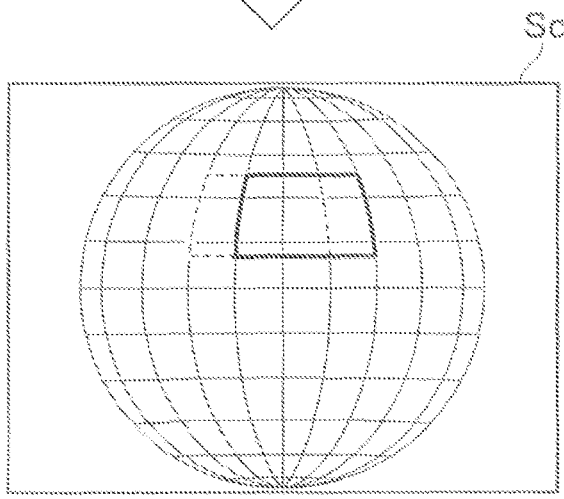
(C)
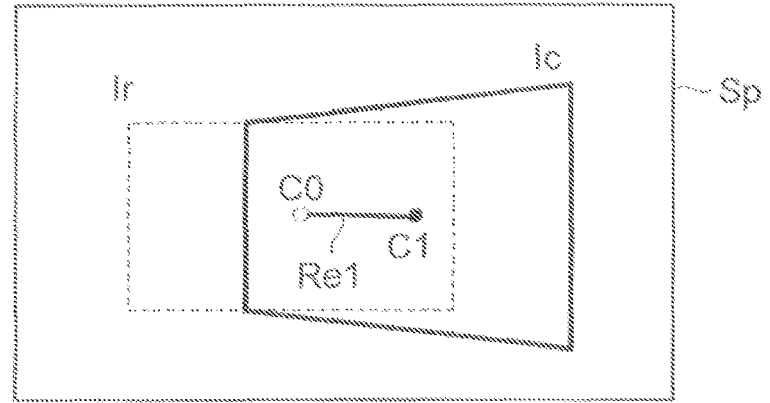

Fig. 12
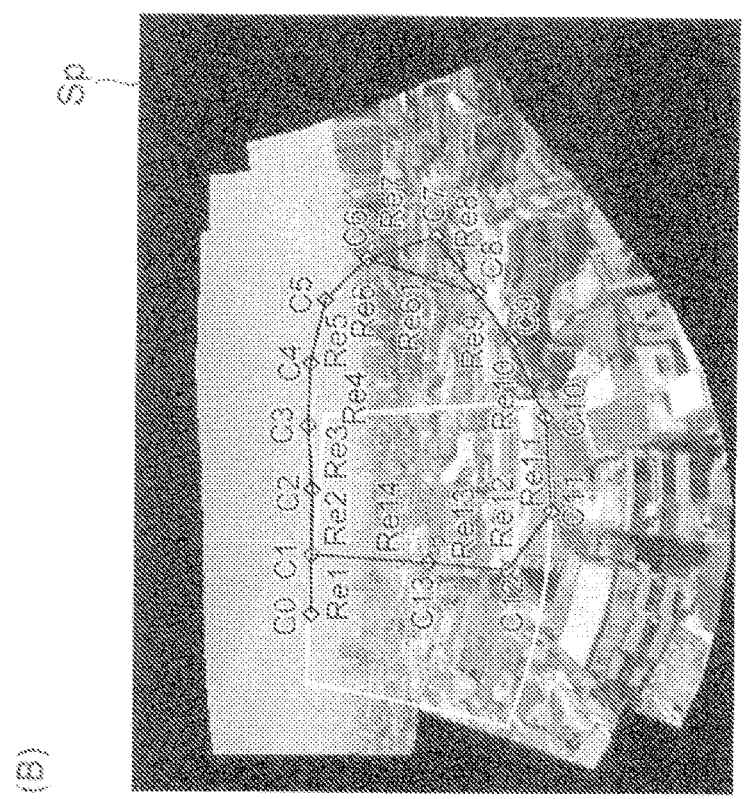
(A)
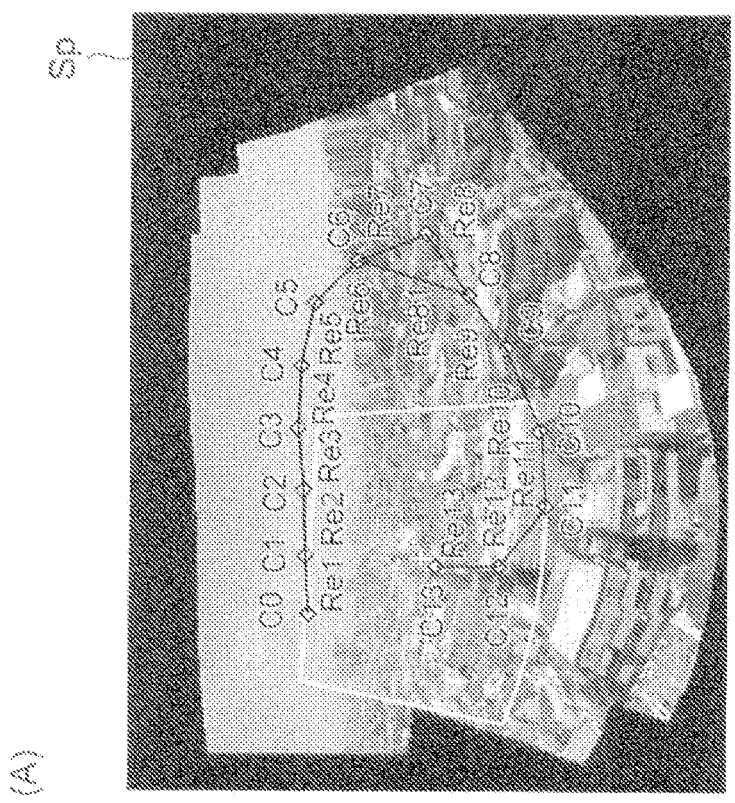
(B)

Fig. 13
(A)
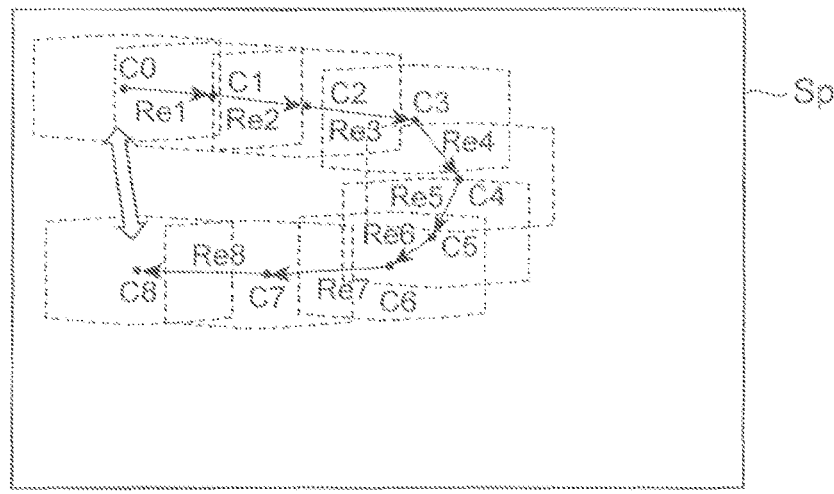
(B)
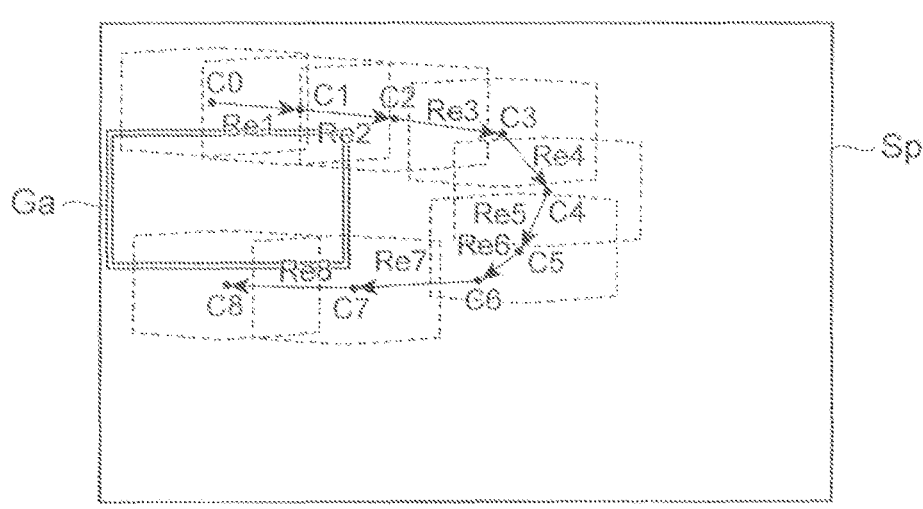
(C)
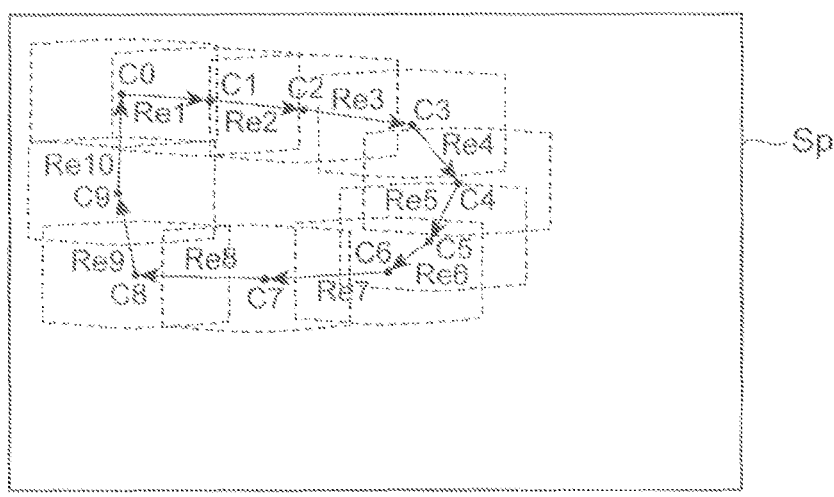

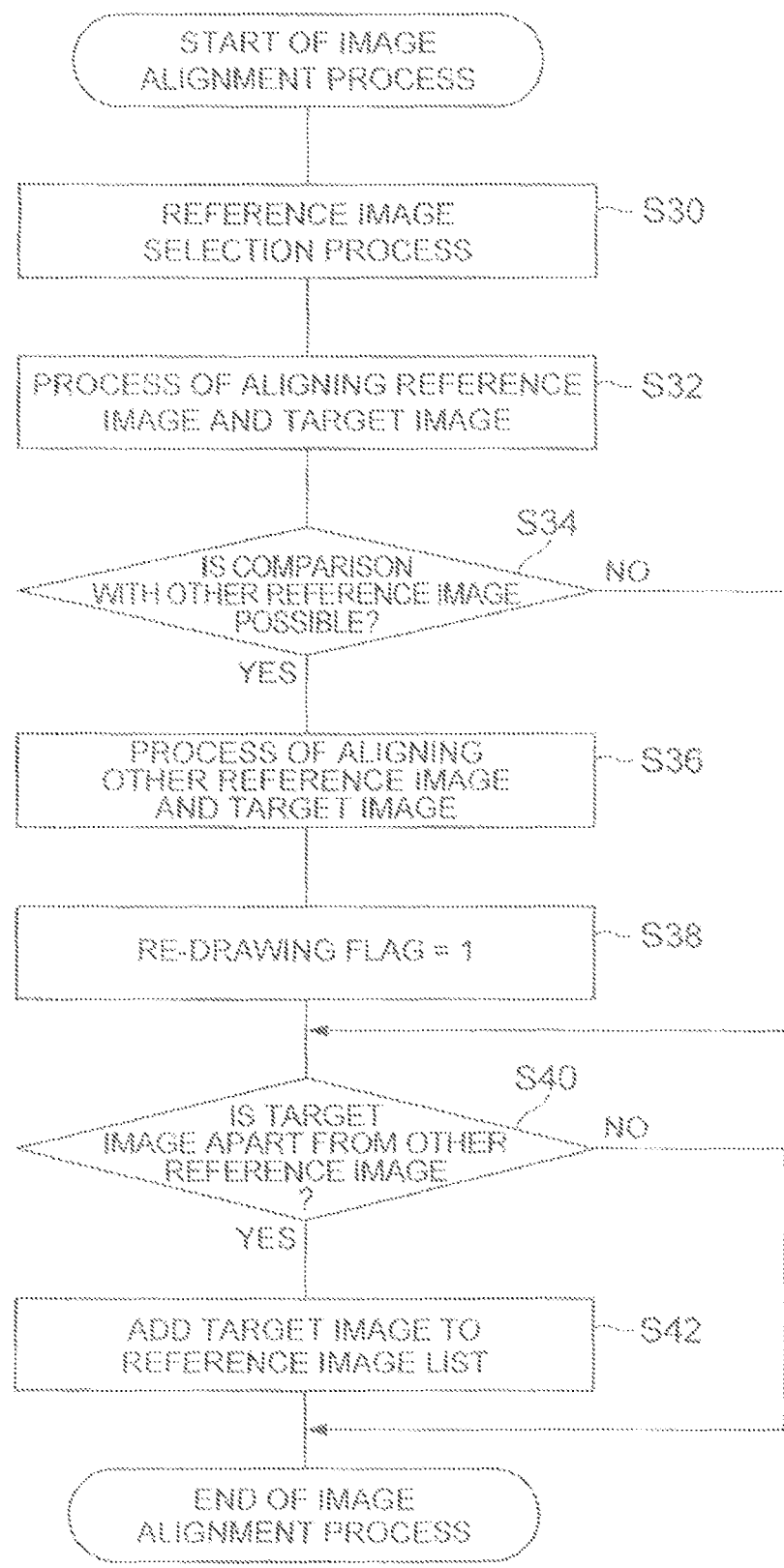

IMAGE PROCESSING DEVICE FOR COMPOSITING PANORAMIC IMAGES, IMAGE PROCESSING PROGRAM AND RECORDING MEDIUM

CROSS REFERENCE TO RELATED APPLICATIONS

This application is a National Stage of International Application No. PCT/JP2012/077491 filed Oct. 24, 2012, the contents of which are incorporated herein by reference in their entirety.

TECHNICAL FIELD

The present invention relates to an image processing device, an image processing method, an image processing program and a recording medium.

BACKGROUND ART

Conventionally, a device that merges captured images to create a panoramic still image being one wide-angle still image is known as an image processing device (e.g., see Patent Document 1). The image processing device described in Patent Document 1 merges a plurality of images obtained by imaging in different orientations from the same point. Specifically, respective coordinate systems of two images are unified using a transformation matrix and then the images are merged. This transformation matrix is calculated using a least-square method.

CITATION LIST

Patent Literature

[Patent Document 1] Japanese Patent Laid-Open Publication No. H11-73492

SUMMARY OF THE INVENTION

Technical Problem

However, in the image processing device described in Patent Document 1, since components of a transformation matrix are not particularly limited, a solution for the matrix tends to be one changing a size thereof in a reducing direction, for example, when a transformation matrix that minimizes a position error between two images after the transformation is obtained using a least-square method. Then, in the image processing device described in Patent Document 1, when target images captured in different orientations are subsequently input and the input reference image and target images are successively merged to generate a panoramic image, the input target image is reduced and merged, and a transformation matrix of the next target image is estimated based on the reduced target image. Therefore, errors are accumulated at every composition and, as a result, a high quality panoramic image may not be obtained.

In the present technical field, when input images are sequentially merged, it is desired to suppress accumulation of errors and obtain a high quality panoramic image even when images having different imaging orientations are included.

Solution to Problem

In other words, an image processing device according to an aspect of the present invention is an image processing device that sequentially inputs an image captured by an imaging element and generates a composite image by merging the image at input timing. And the device includes an input unit, a selection unit, a matching unit, an estimation unit and a merging unit. The input unit sequentially inputs the images. The selection unit selects a reference image from among input images including one or a plurality of images input by the input unit prior to a target image being a processing target image newly input by the input unit. The matching unit calculates a correspondence relationship between a feature point of the reference image and a feature point of the target image. The estimation unit regards a motion between the reference image and the target image as only a rotational motion of the imaging element, and estimates a transformation equation that causes a coordinate system of the reference image to correspond to a coordinate system of the target image using positional information of a pair of feature points that have the correspondence relationship calculated by the matching unit. The merging unit merges the reference image with the target image to generate the composite image based on the transformation equation.

In the image processing device according to the aspect of the present invention, a motion between the reference image and the target image is regarded as being caused by only a rotational motion of the imaging element to estimate a transformation equation that causes the coordinate systems of both images to correspond to each other. Therefore, since parameters of expansion, reduction, and translation are not included in the transformation equation, it is possible to prevent the input target image from being, for example, reduced and errors from being caused. Further, since limiting to only the rotational component makes it possible to prevent the reduced target image from being used as a reference image for next and subsequent input, it is possible to avoid the accumulation of errors. Thus, when input images are sequentially merged, it is possible to suppress the accumulation of errors and obtain a high quality panoramic image even when images having different imaging orientations are included.

In one embodiment, the estimation unit may estimate the transformation equation including only a rotational component of each axis of a three-dimensional coordinate system having a position of the imaging element as an origin.

In one embodiment, the estimation unit may prepare for an objective function including a difference between respective positional information of the pair of feature points transformed using the transformation equation, and estimate the transformation equation by performing a convergence calculation so as to be a minimum value of the objective function using an optimization scheme. Through this configuration, it is possible to accurately estimate the transformation equation that causes the coordinate systems to correspond to each other between the reference image and the target image.

In one embodiment, when there are a plurality of images input by the input unit prior to the target image, the estimation unit may adopt the transformation equation of the image input by the input unit immediately before the target image as an initial value of the convergence calculation. Through this configuration, since the convergence of the calculation is performed rapidly, it is possible to realize suppression of a calculation cost and improvement of a calculation speed.

In one embodiment, the estimation unit may project the pair of feature points that have the correspondence relationship calculated by the matching unit onto a spherical surface, and estimate the transformation equation that causes a coordinate system of the reference image to correspond to the coordinate system of the target image using positional information of the pair of feature points after the projection. Through this configuration, since the division of variables is not included in the coordinates after the transformation equation is used, it is possible to realize suppression of a calculation cost and improvement of a calculation speed.

In one embodiment, when there are a plurality of images input by the input unit prior to the target image, and at least one of the images input by the input unit prior to the target image overlaps with the reference image and the target image, the estimation unit may estimate the transformation equation that causes a coordinate system of the reference image to correspond to the coordinate system of an image overlapping with the reference image and the transformation equation that causes the coordinate system of the reference image to correspond to the coordinate system of the target image in association with each other using a pair of feature points of the reference image and each of the image overlapping with the reference image and the target image.

Through this configuration, since the positional relationship between the reference image and the target image as well as the reference image and another image is considered and then the positional relationship of these images can be estimated, it is possible to improve precision of the transformation equation.

In one embodiment, when a distance between the reference image and the target image is equal to or more than a predetermined value, the selection unit may select the target image as the reference image of the target image being the processing target image input next or newly input subsequently by the input unit. Through this selection, it is possible to select a reference image having a large overlapping area with the target image.

In one embodiment, when a distance between the target image and a past reference image is smaller than the distance between the target image and the reference image, the selection unit may select the past reference image as the reference image of the target image being the processing target image input next or newly input subsequently. Through this selection, it is possible to select a reference image having a large overlapping area with the target image.

In one embodiment, the matching unit may further calculate the correspondence relationship between the feature point of the past reference image and the feature point of the target image when the distance between the target image and the past reference image is equal to or less than a predetermined value, and the estimation unit may further estimate a transformation equation that causes the coordinate system of the past reference image to correspond to the coordinate system of the target image using positional information of the pair of feature points of the past reference image and the target image, and cause the reference image to correspond to the past reference image using the transformation equation that causes the coordinate system of the reference image to correspond to the coordinate system of the target image and the transformation equation that causes the coordinate system of the past reference image to correspond to the coordinate system of the target image. Through this configuration, since reference images that originally have much less overlap can be matched through the target image, it is possible to obtain a higher quality panoramic image.

In one embodiment, the device may further include a guide unit connected to a display unit that displays an image and displaying a guide display on the display unit to induce a camera manipulation of a user, the estimation unit may link the reference image and the target image that are used for estimating the transformation equation and record the reference image and the target image as a pair whose relative position has been determined, the merging unit may output the composite image to the display unit, and when there is a first image whose number of hops with the current reference image is equal to or higher than a predetermined value and which does not overlap with the current reference image among the pair whose relative position has been determined, the guide unit may display the guide display on the display unit to guide an imaging position from a current imaging position to an image position of the first image. Through this configuration, it is possible to promote a user manipulation to avoid a situation in which a composition is performed in a state in which an error is accumulated by a positional relationship between the first image and the reference image being relatively determined through a plurality of images.

An image processing method according to another aspect of the present invention is an image processing method that sequentially inputs an image captured by an imaging element and generates a composite image by merging the image at input timing. The method includes an input step, a selection step, a matching step, an estimation step and a merging step. In the input step, the images are sequentially input. In the selection step, a reference image is selected from among input images including one or a plurality of images input in the input step prior to a target image being a processing target image newly input in the input unit. In the matching step, a correspondence relationship between a feature point of the reference image and a feature point of the target image is calculated. In the estimation step, a motion between the reference image and the target image is regarded as only a rotational motion of the imaging element, and a transformation equation that causes a coordinate system of the reference image to correspond to a coordinate system of the target image is calculated using positional information of a pair of feature points whose correspondence relationship has been calculated in the matching step. In the merging step, the reference image is merged with the target image to generate the composite image based on the transformation equation.

According to this image processing method, it is possible to achieve the same effects as those of the image processing device according to an aspect of the present invention described above.

An image processing program according to another aspect of the present invention is an image processing program for causing a computer to function to sequentially input an image captured by an imaging element and generate a composite image by merging image at input timing. The program causes the computer to function as an input unit, a selection unit, a matching unit, an estimation unit and a merging unit. The input unit sequentially inputs the images. The selection unit selects a reference image from among input images including one or a plurality of images input by the input unit prior to a target image being a processing target image newly input by the input unit. The matching unit calculates a correspondence relationship between a feature point of the reference image and a feature point of the target image. The estimation unit regards a motion between the reference image and the target image as only a rotational motion of the imaging element, and estimates a transformation equation that causes a coordinate system of the reference image to correspond to a coordinate system of the target image using positional information of a pair of feature points whose correspondence relationship has been calculated by the matching unit. The merging unit merges the reference image with the target image to generate the composite image based on the transformation equation.

According to this image processing program, it is possible to achieve the same effects as those of the image processing device according to an aspect of the present invention described above.

A recording medium according to another aspect of the present invention is a computer-readable recording medium having an image processing program recorded thereon for causing a computer to function to sequentially input images captured by an imaging element and generate a composite image by merging image at input timing. The program causes the computer to function as an input unit, a selection unit, a matching unit, an estimation unit and a merging unit. The input unit sequentially inputs the images. The selection unit selects a reference image from among input images including one or a plurality of images input by the input unit prior to a target image being a processing target image newly input by the input unit. The matching unit calculates a correspondence relationship between a feature point of the reference image and a feature point of the target image. The estimation unit regards a motion between the reference image and the target image as only a rotational motion of the imaging element, and estimates a transformation equation that causes a coordinate system of the reference image to correspond to a coordinate system of the target image using positional information of a pair of feature points whose correspondence relationship has been calculated by the matching unit. The merging unit merges the input image with the target image to generate the composite image based on the transformation equation.

According to this recording medium, it is possible to achieve the same effects as those of the image processing device according to an aspect of the present invention described above.

According to various aspects and embodiments of the present invention, the image processing device, the image processing method, the image processing program and the recording medium capable of suppressing accumulation of errors and obtaining a high quality panoramic image even when images having different imaging orientations are included when input images are sequentially merged are provided.

BRIEF DESCRIPTION OF DRAWINGS

FIG. 5 is an overview diagram illustrating alignment of a reference image and a target image;

FIG. 8 is an overview diagram illustrating details of alignment of the reference image and the target image;

FIG. 12 is an overview diagram illustrating alignment between reference images;

FIG. 13 is an overview diagram illustrating guide display;

FIG. 16 is a flowchart illustrating operation of an image processing device according to an embodiment.

DESCRIPTION OF EMBODIMENTS

Figure 1:
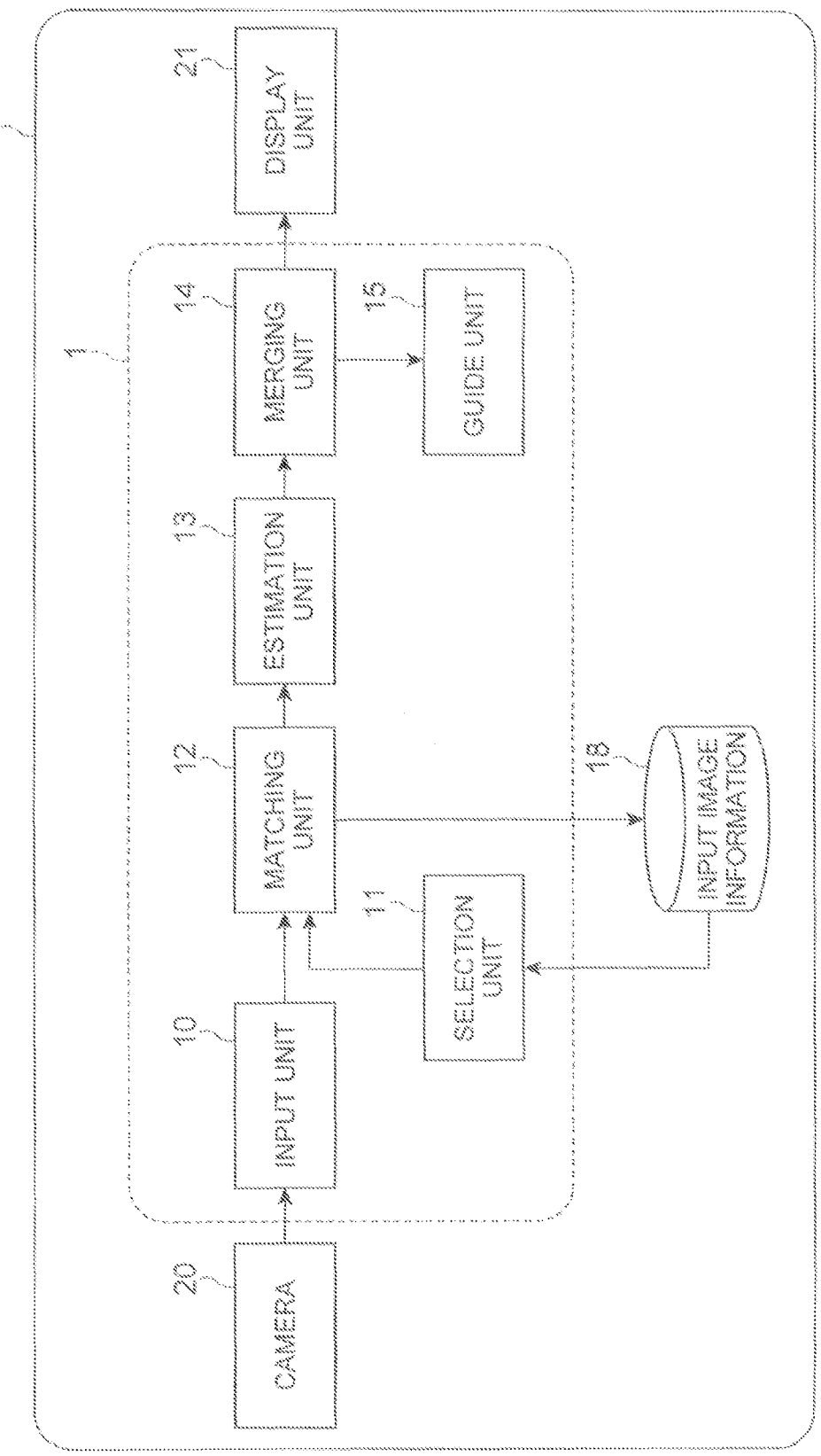
FIG. 1 is a functional block diagram of a portable terminal with an image processing device according to an embodiment.

Hereinafter, embodiments of the present invention will be described with reference to the accompanying drawings. Further, the same or equivalent parts in respective figures are denoted with the same reference numerals and a redundant explanation thereof is omitted.

An image processing device according to the present embodiment is a device that merges input images at every input to successively create one image, and is suitably adopted, for example, when a plurality of continuously captured images are merged in real time to generate a wider angle panoramic image than one captured image. The image processing device according to the present embodiment is suitably mounted, for example, on a mobile terminal with limited resources such as a portable telephone, a digital camera or a PDA (Personal Digital Assistant), but the present invention is not limited thereto and the image processing device may be mounted on, for example, a normal computer system. Further, hereinafter, an image processing device mounted on a portable terminal having a camera function will be described as an example of the image processing device according to the present invention in consideration of ease of understanding of explanation.

Figure 2:
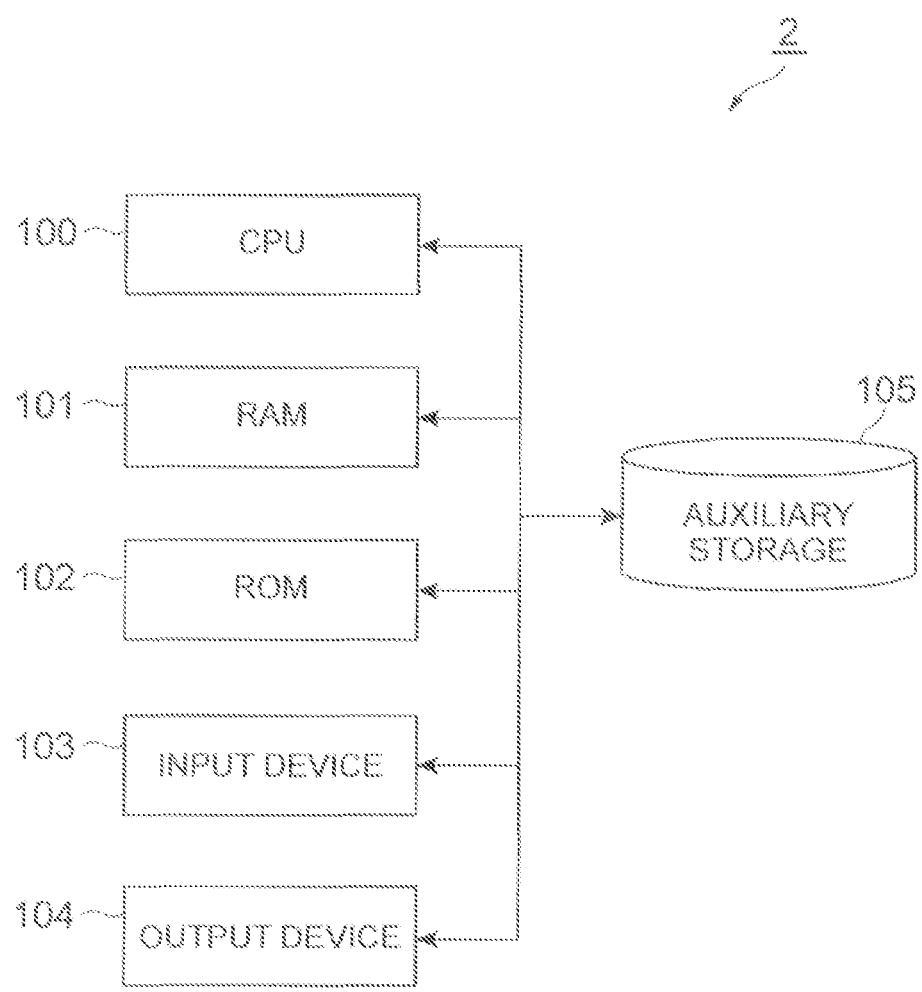
FIG. 2 is a hardware configuration diagram of the portable terminal with the image processing device according to an embodiment.

FIG. 1 is a functional block diagram of a portable terminal 2 including an image processing device 1 according to the present embodiment. The portable terminal 2 illustrated in FIG. 1, for example, is a mobile terminal carried by a user and has a hardware configuration illustrated in FIG. 2. FIG. 2 is a hardware configuration diagram of the portable terminal 2. The portable terminal 2 is physically configured as a normal computer system including a CPU (Central Processing Unit) 100, a main storage device such as a ROM (Read Only Memory) 101 and a RAM (Random Access Memory) 102, an input device 103 such as a camera or a keyboard, an output device 104 such as a display, an auxiliary storage device 105 such as a hard disk, and the like, as illustrated in FIG. 2. Each of functions of the portable terminal 2 and the image processing device 1 that will be described below is realized by operating the input device 103 and the output device 104 under control of the CPU 100 and performing reading and writing of data in the main storage device or the auxiliary storage device 105 by loading predetermined computer software on hardware such as the CPU 100, the ROM 101 and the RAM 102. Further, while the hardware configuration of the portable terminal 2 has been described above, the image processing device 1 may also be configured as a normal computer system including the CPU 100, the main storage device such as the ROM 101 and the RAM 102, the input device 103, the output device 104, the auxiliary storage device 105, and the like. Further, the portable terminal 2 may further include a communication module or the like.

The portable terminal 2 includes a camera 20, the image processing device 1 and a display unit 21, as illustrated in FIG. 1. The camera 20 has a function of capturing an image. For example, an imaging element is used as the camera 20. The camera 20 has, for example, a continually-imaging function of performing repetitive imaging at predetermined intervals from a timing designated by a user manipulation or the like. The user can capture continuous images overlapping at up, down, left or right portion thereof at least, for example, by sliding the camera 20 or rotating the camera 20 with respect to a predetermined position as an origin. Also, the camera 20 has, for example, a function of outputting the captured image to the image processing device 1 at every imaging. The display unit 21 is a display device that can display a composite image or the like.

Figure 3:
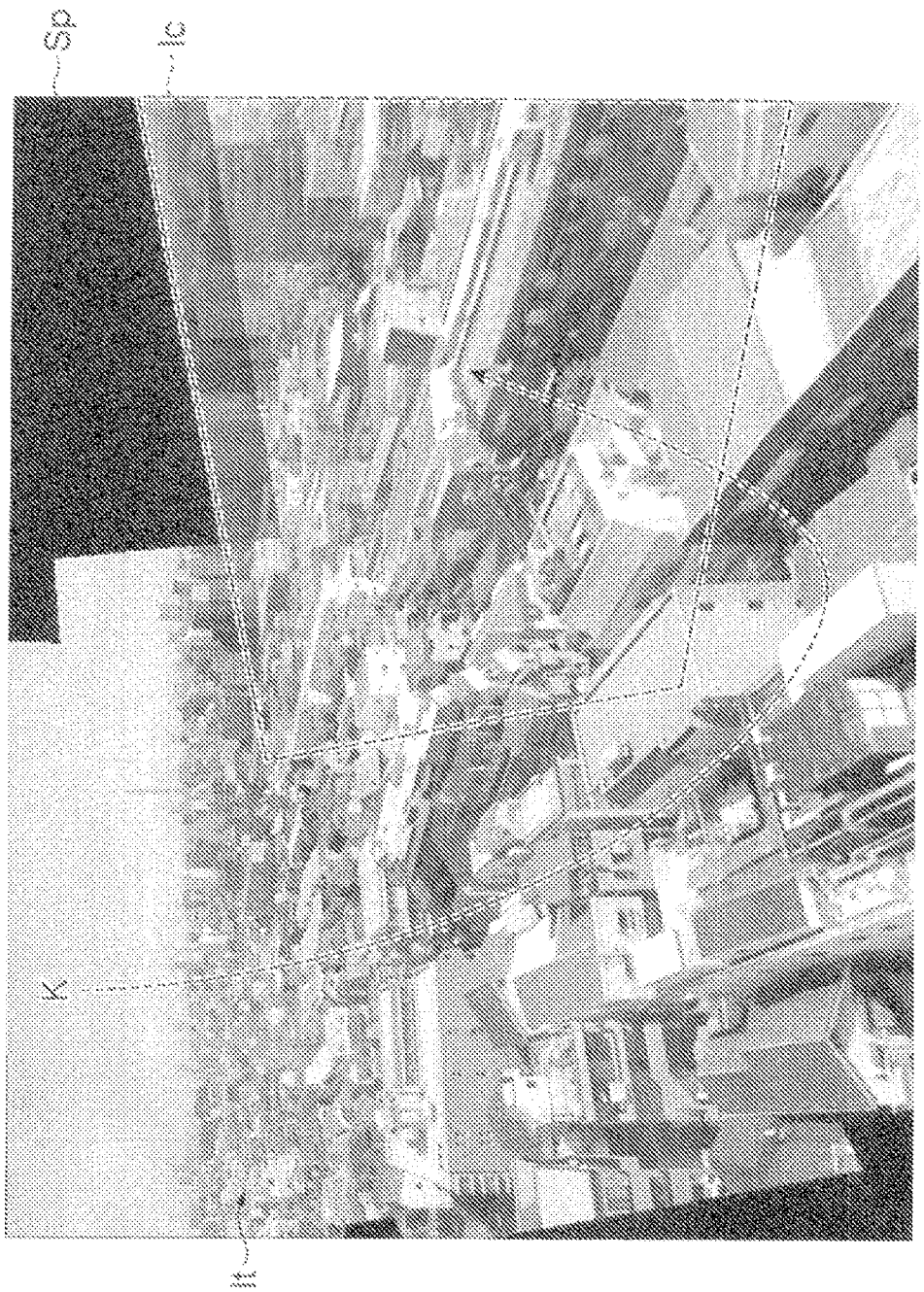
FIG. 3 is an overview diagram illustrating a wide-angle panoramic composite image.
Figure 4:
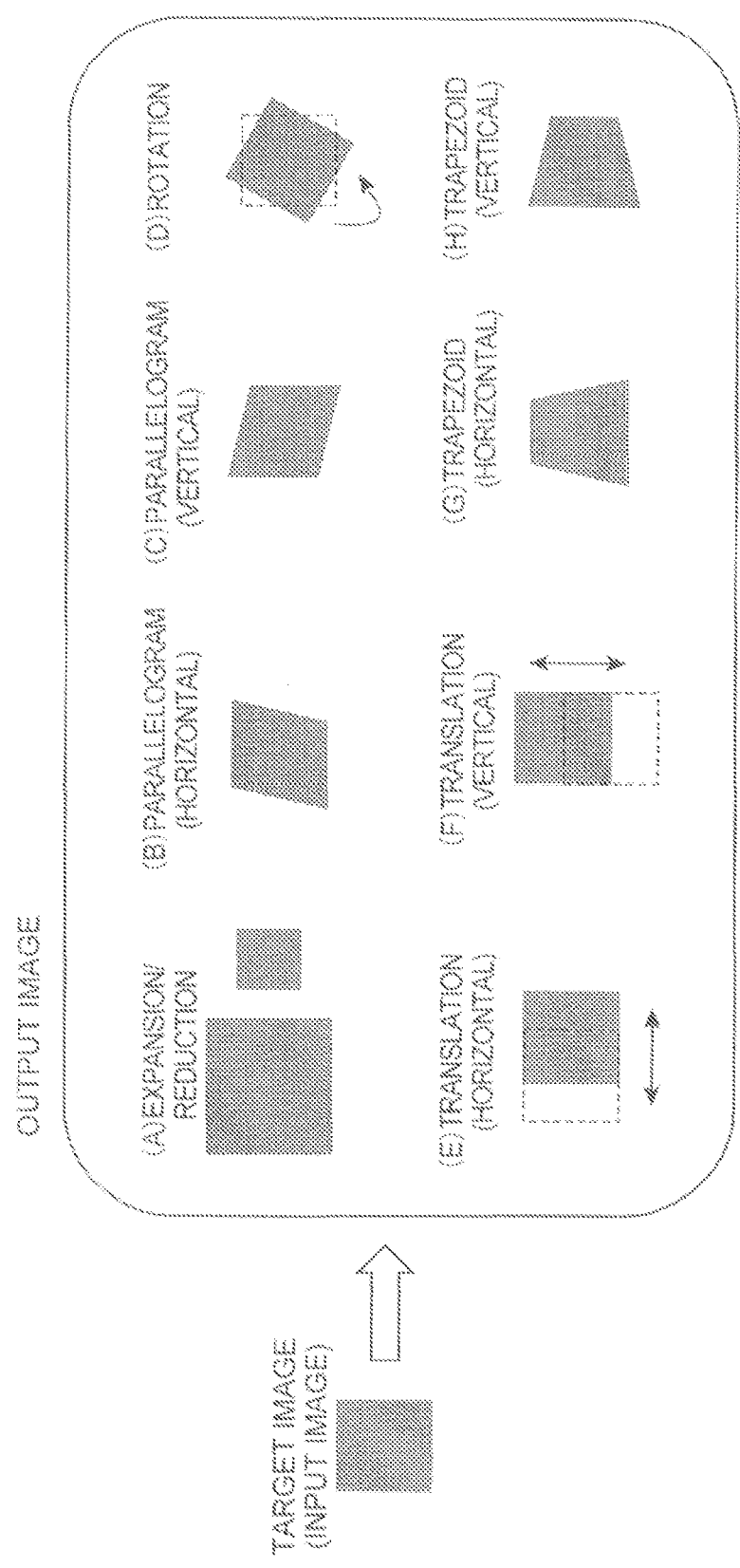
FIG. 4 is an overview diagram illustrating transformation at the time of composition of a target image.

The image processing device 1 has a function of sequentially merging the obtained images to generate a panoramic composite image of a wide angle. A viewing angle of a normal camera is approximately 50 to 65 degrees (diagonal angle of view), and the image processing device 1 merges input images to generate an image of angles of view equal to or more than 65 degrees by having a function that will be described below. For example, when an imaging direction of the camera 20 is changed as indicated by an arrow K as illustrated in FIG. 3, sequentially input images are merged to sequentially draw a composite image on a composition plane Sp. For example, when a currently input image is Ic, the image Ic is merged with a current composite image It and one composite image is generated. Further, the image processing device 1 does not just merge the target image Ic being a composition process target to the composite image It, but performs a deformation process thereon and then merges the resultant image to the composite image It. For example, the image processing device 1 deforms the target image Ic so as to (A) be expanded/reduced, (B) be a parallelogram (in horizontal direction) (C) be a parallelogram (in vertical direction), (D) be rotated, (E) be translated (in horizontal direction), (F) be translated (in vertical direction), (G) be a trapezoid (in horizontal direction), or (H) be a trapezoid (in vertical direction), as illustrated in FIG. 4. The target image Ic subjected to such a deformation process or a merged deformation process is drawn onto the composition plane Sp. Transformation of the eight degrees of freedom of (A) to (H) is adopted such that it is difficult for misalignment to occur at a joint of the images and it is possible to obtain a natural wide-angle panorama.

Hereinafter, details of the image processing device 1 will be described. The image processing device 1 includes an input unit 10, a selection unit 11, a matching unit 12, an estimation unit 13, a merging unit 14 and a guide unit 15.

The input unit 10 has a function of inputting the image captured by the camera 20. The input unit 10, for example, has a function of inputting the image captured by the camera 20 at every imaging. Further, the input unit 10 has a function of storing an initially input image in a first temporary storage area (a buffer for an output image) included in the portable terminal 2. Further, the input unit 10 has a function of storing next and subsequent continuously-input images in a second temporary storage area (a buffer for an input image) included in the portable terminal. Further, when the images are stored in the second temporary storage area, positioning of the image is performed and it is determined whether the image is a drawing target. When it is determined that the image is an image of the drawing target, the output image stored in the first temporary storage area is updated through composition, overwritten and stored. Hereinafter, a description will be given in which the image stored in the first temporary storage area is the composite image It and the image stored in the second temporary storage area is the target image Ic (input image).

The selection unit 11 has a function of selecting a reference image for alignment. The reference image is an image serving as a reference for alignment of the target image Ic. For example, the selection unit 11 is configured to be able to refer to a memory 18 that stores information regarding the input image. The input image is an image input by the input unit 10 prior to the target image Ic, and may be one or a plurality of images. In other words, when an $n^{th}$ target image Ic is Ic(n−1), the input images becomes Ic(n−2), Ic(n−3), . . . , Ic0. When there is one input image, the selection unit 11 selects the image Ic1 as a reference image Ir0 of the target image Ic2. The selection unit 11 then does not change the reference image until a predetermined condition is satisfied. The predetermined condition is that a distance between the reference image and the target image Ic(n) be equal to or more than a predetermined value. In this case, the selection unit 11 selects the target image Ic(n) as a reference image Ir(k) of a new target image Ic(n+1) and stores information regarding the target image Ic(n) in the memory 18. The information regarding the target image Ic(n), for example, may be only a pixel value and positional information of a feature point derived by the matching unit 12 that will be described below. Thus, amount of memory to be used can be reduced in comparison with a case in which the reference image Ir itself is stored, by limiting the information to be recorded in the memory 18. Also, when the target image Ic(n+1) is input, the selection unit 11 selects the target image Ic(n) as the reference image Ir(k) by referring to the memory 18. Thus, the selection unit 11 selects one reference image Ir for each target image Ic. In one embodiment, when a predetermined condition is satisfied, the selection unit 11 may also select a temporary reference image for the target image Ic(n). The temporary reference image is an image selected from among the input images and is a reference image being temporary. Details of a process of selecting the temporary reference image will be described below. The selection unit 11 outputs image information on the reference image Ir (information including at least pixel information and positional information of the feature point) to the matching unit 12.

The matching unit 12 acquires a correspondence relationship between the reference image Ir and the target image Ic. The matching unit 12 acquires information regarding a feature point of the reference image Ir and a feature point of the target image Ic. The matching unit 12 acquires, for example, a correspondence relationship between the reference image Ir and the target image Ic based on the pixel value of the feature point. A conventional scheme such as a block matching method may be used as a matching method. In one embodiment, the matching unit 12 may cause the reference image Ir and the target image Ic to be multi-resolutioned and then match the reference image Ir and the target image Ic. For example, the matching unit 12 gradually changes the resolution of each of the reference image Ir and the target image Ic, and generates a plurality of images having different resolutions. Also, the matching unit 12 may acquire an amount of translation of the feature point between images having the lowest resolution and perform matching between images having higher resolution in units of pixels of the feature point. In this case, it is possible to achieve high speed processing and reduce a calculation cost.

The matching unit 12 acquires positional information (coordinate information) of a pair of feature points at which the correspondence relationship between the reference image Ir and the target image Ic has been calculated. In other words, the matching unit 12 acquires a pair of positional information of a certain feature point of the reference image Ir and positional information of a feature point of the target image Ic corresponding to the feature point of the reference image Ir. The matching unit 12 acquires a plurality of pairs of feature points for an alignment process that will be described below. The matching unit 12 outputs the acquired pairs of feature points to the estimation unit 13. Further, when the selection unit 11 adds the target image Ic as the reference image Ir for next and subsequent input as described above, the matching unit 12 outputs the pixel value and the positional information of the feature point of the target image Ic to the selection unit 11.

The estimation unit 13 has a function of performing alignment of the reference image Ir and the target image Ic based on the correspondence relationship between the reference image Ir and the target image Ic. FIG. 5 is an overview diagram illustrating an overview of alignment of the reference image and the target image Ic. For example, when only a first image is input, the image is selected as a reference image Ir0, as illustrated in FIG. 5(A). Also, when a second image (target image Ic) is input, the estimation unit 13 aligns the target image Ic based on a position of the reference image Ir0. The alignment is performed to determine a relative position between a predetermined point (here, a center C0) of the reference image Ir0 and a predetermined point (here, a center C1) of the target image Ic, for example as illustrated in FIG. 5(B). The estimation unit 13 searches for a position at which the pair of feature points acquired by the matching unit 12 overlap with each other at the largest area. Also, when the alignment of the reference image Ir0 and the target image Ic is completed by the estimation unit 13, the information indicating that a positional relationship thereof (link Re1) is linked is recorded, as illustrated in FIG. 5(C). Further, as described above, when the alignment is completed by the estimation unit 13 and the relative distance between the reference image Ir0 and the target image Ic is equal to or more than a predetermined value, it is necessary for the selection unit 11 to add the target image Ic as a reference image In for next and subsequent input, and accordingly the matching unit 12 outputs the pixel value and the positional information of the feature point of the target image Ic to the selection unit 11.

Figure 6:
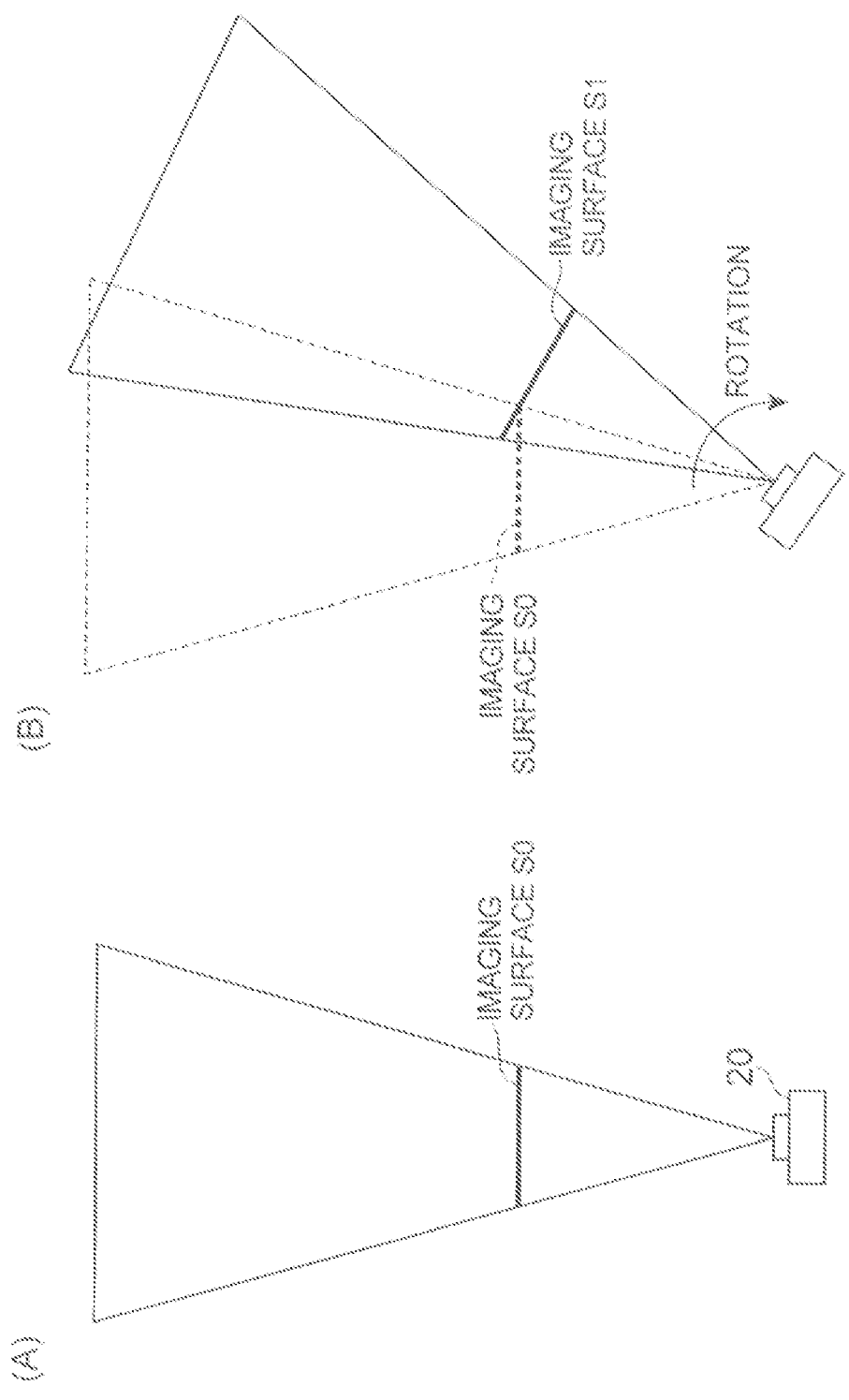
FIG. 6 is an overview diagram illustrating transformation at the time of composition of a target image based on camera rotation.

The estimation unit 13 performs the alignment of the reference image Ir and the target image Ic in consideration of a motion of the camera. FIG. 6 is an overview diagram illustrating an imaging surface due to rotation of the camera 20. For example, when the imaging surface of the camera 20 before the rotation is S0 and the imaging surface of the camera 20 after the rotation is S1, the imaging surface S0 and the imaging surface S1 are not coplanar, as illustrated in FIG. 6. Therefore, positions overlapping due to translation of the pair of feature points differ from the original overlapping positions. In other words, when the alignment is performed, it is necessary to perform the alignment so that the position of the feature point of the target image Ir and the position of the feature point of the reference image Ic match on the same three-dimensional coordinate system in consideration of the motion of the camera.

Figure 7:
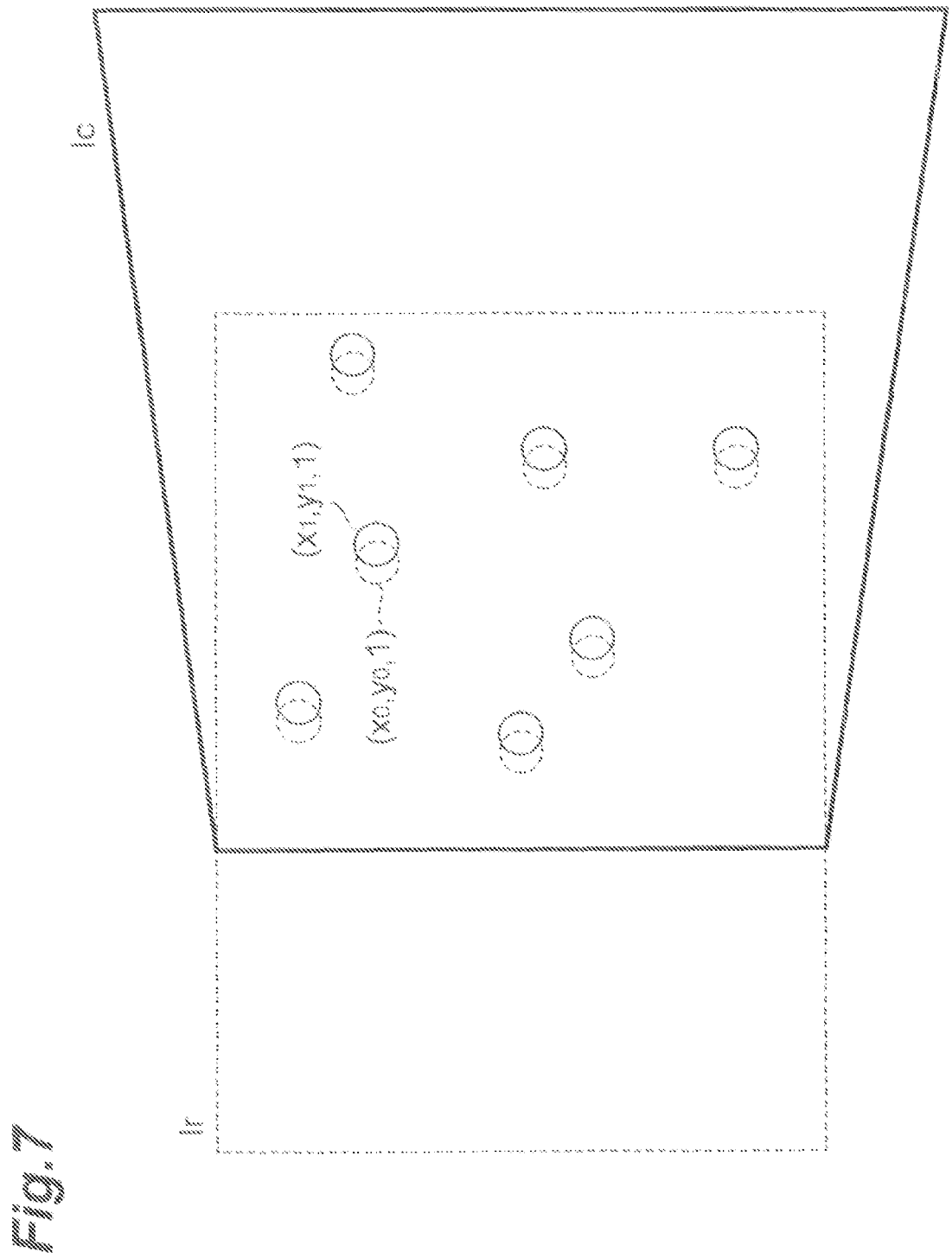
FIG. 7 is an overview diagram illustrating a correspondence point of the reference image and the target image.

Thus, the estimation unit 13 estimates a transformation equation to match a three-dimensional coordinate system of the reference image Ir0 with a three-dimensional coordinate system of the target image Ic. When coordinates of the feature point of the reference image Ir0 are $(x_0, y_0, 1)$ and coordinates of the feature point of the target image Ic corresponding to the feature point of the reference image Ir0 are $(x_1, y_1, 1)$ as illustrated in FIG. 7, the estimation unit 13 estimates a transformation equation to match $(x_0, y_0, 1)$ with $(x_1, y_1, 1)$. Here, a focal length indicates one degree of freedom, motions of the camera (translation in an xy direction and expansion and reduction due to a movement in a z direction) indicate three degrees of freedom, and rotation of the camera (distortion (trapezoid) of the image in the x direction and the y direction) and rotation of the image about the z axis indicate three degrees of freedom, whereby seven degrees of freedom as a result. When the degrees of freedom of the camera are approximated to be eight degrees of freedom in consideration of rolling shutter distortion (focal-plane distortion), this is expressed as shown in Equation (1) below.

$$\begin{pmatrix} x_0 \\ y_0 \\ 1 \end{pmatrix} = \begin{pmatrix} a_1 & b_1 & c_1 \\ d_1 & e_1 & f_1 \\ g_1 & h_1 & 1 \end{pmatrix} \cdot \begin{pmatrix} x_1 \\ y_1 \\ 1 \end{pmatrix} \quad (1)$$

Parameters $a_1$ to $h_1$ of the transformation matrix (transformation equation) are parameters relating to the eight degrees of freedom as described above. The estimation unit 13 obtains parameters of the transformation matrix enabling a plurality of pairs of feature points to satisfy the relationship through a convergence calculation based on an optimization scheme. Specifically, the convergence calculation is performed so that an objective function including a difference between the position $(x_0, y_0, 1)$ of the feature point of the reference image Ir and a position obtained by converting the position $(x_1, y_1, 1)$ of the feature point of the target image Ic is a minimum value. For the optimization scheme, a well-known scheme such as a Newton method or a Gauss-Newton method is adopted.

Here, the estimation unit 13 has a function of limiting motions of the camera 20 to three degrees of freedom under the assumption that the motion between the reference image Ir and the target image Ic is only a rotational motion of the camera 20, and using the positional information of the pair of feature points to estimate the transformation equation. For example, when an imaging position of the camera 20 is an origin, the degrees of freedom of the camera are limited to only rotation of the X axis, the Y axis, and the Z axis, as illustrated in FIG. 7. When parameters of the respective axes are $(\beta, \alpha, \gamma)$, the transformation matrix R can be expressed as follows.

$$R = R_z \cdot R_x \cdot R_y =$$

$$\begin{pmatrix} \cos(\gamma) & -\sin(\gamma) & 0 \\ \sin(\gamma) & \cos(\gamma) & 0 \\ 0 & 0 & 1 \end{pmatrix} \cdot \begin{pmatrix} 1 & 0 & 0 \\ 0 & \cos(\beta) & -\sin(\beta) \\ 0 & \sin(\beta) & \cos(\beta) \end{pmatrix} \cdot \begin{pmatrix} \cos(\alpha) & 0 & \sin(\alpha) \\ 0 & 1 & 0 \\ -\sin(\alpha) & 0 & \cos(\alpha) \end{pmatrix}$$

In other words, the position $(x_0, y_0, 1)$ of the feature point of the reference image Ir and the position $(x_1, y_1, 1)$ of the feature point of the target image Ic may be caused to correspond to each other as shown in Equation (2) below using the transformation matrix R.

$$\begin{pmatrix} x_0 - c_x \\ y_0 - c_y \\ F \end{pmatrix} \cong R \cdot \begin{pmatrix} x_1 - c_x \\ y_1 - c_y \\ F \end{pmatrix} \quad (2)$$

Here, $(c_x, c_y)$ denotes respective center coordinates when image sizes of the reference image Ir and the target image Ic are the same. Further, F denotes a focal length. Further, for the focal length F, a value obtained from specification information of the camera 20 may be applied.

As shown in Equation (1), when the convergence calculation is performed using the transformation matrix in which the reduction component is considered and in preferential consideration of error reduction, reduction of the image leads to a relatively smaller error, and accordingly, a solution for the transformation matrix tends to be one increasing a degree of the reduction component. In this case, errors are accumulated whenever successive composition is performed and, as a result, a high quality panoramic image is not obtained. On the other hand, since the reduction component is not considered at the time of the convergence calculation based on the optimization scheme by limiting the transformation matrix R to only the rotational component as illustrated in Equation (2), it is possible to prevent the accumulation of errors, and a high quality panoramic composite image is generated. Further, a transformation matrix of the previous target image Ic may be adopted as an initial value of the convergence calculation in the optimization scheme such as a Gauss-Newton method. In this case, since it is easy for convergence to be faster in the convergence calculation, it is possible to improve calculation speed.

In one embodiment, when convergence calculation is performed for Equation (2) to estimate the transformation matrix, the estimation unit 13 projects two-dimensional coordinates of the feature point onto a spherical surface of the three-dimensional space Sp and estimates a transformation matrix using a correspondence relationship of the projected coordinates. FIG. 8 is an overview diagram illustrating details of alignment of the reference image Ir and the target image Ic. The estimation unit 13 performs perspective projection of the position $(x_0, y_0, 1)$ of the feature point of the reference image Ir of the two-dimensional coordinate system and the position $(x_1, y_1, 1)$ of the target image Ic of the two dimensional coordinate system onto the spherical surface of the three-dimensional space Sp, as illustrated in FIGS. 8(A) and 8(B). When $x_n-c_x$ is a vector $x_n$, $y_n-c_x$ is a vector $y_n$, and coordinates after the projection are $(X_n, Y_n, Z_n)$, for example, the projection is performed for the coordinates $(x_1, y_1, F)$ as shown in Equation (3) below.

$$\begin{pmatrix} X_1 \\ Y_1 \\ Z_1 \end{pmatrix} = \frac{1}{\sqrt{x_1^2 + y_1^2 + F^2}} \begin{pmatrix} \hat{x}_1 \\ \hat{y}_1 \\ F \end{pmatrix} \quad (3)$$

Further, the coordinate point after the transformation using the transformation matrix R can be expressed as follows.

$$\begin{pmatrix} R(X_1) \\ R(Y_1) \\ R(Z_1) \end{pmatrix} = R \cdot \begin{pmatrix} X_1 \\ Y_1 \\ Z_1 \end{pmatrix}$$

Therefore, an objective function of the convergence calculation includes the following difference r.

$r_x = R(X_1) - X_0$ $r_y = R(Y_1) - Y_0$ $r_z = R(Z_1) - Z_0$

Further, when a distance between the target image Ic and the reference image Ir is assumed to be small, the transformation of Equation (3) may be omitted. In this case, it is not necessary to consider truncation of the division since the difference r is in the form which does not include the division. Therefore, for example, when the objective function is subjected to the convergence calculation through an optimization process based on a Gauss-Newton method or the like, the calculation can be facilitated. Thus, when the calculation is performed through projection onto the spherical surface of the three-dimensional space, it is possible to reduce a calculation cost.

Figure 9:
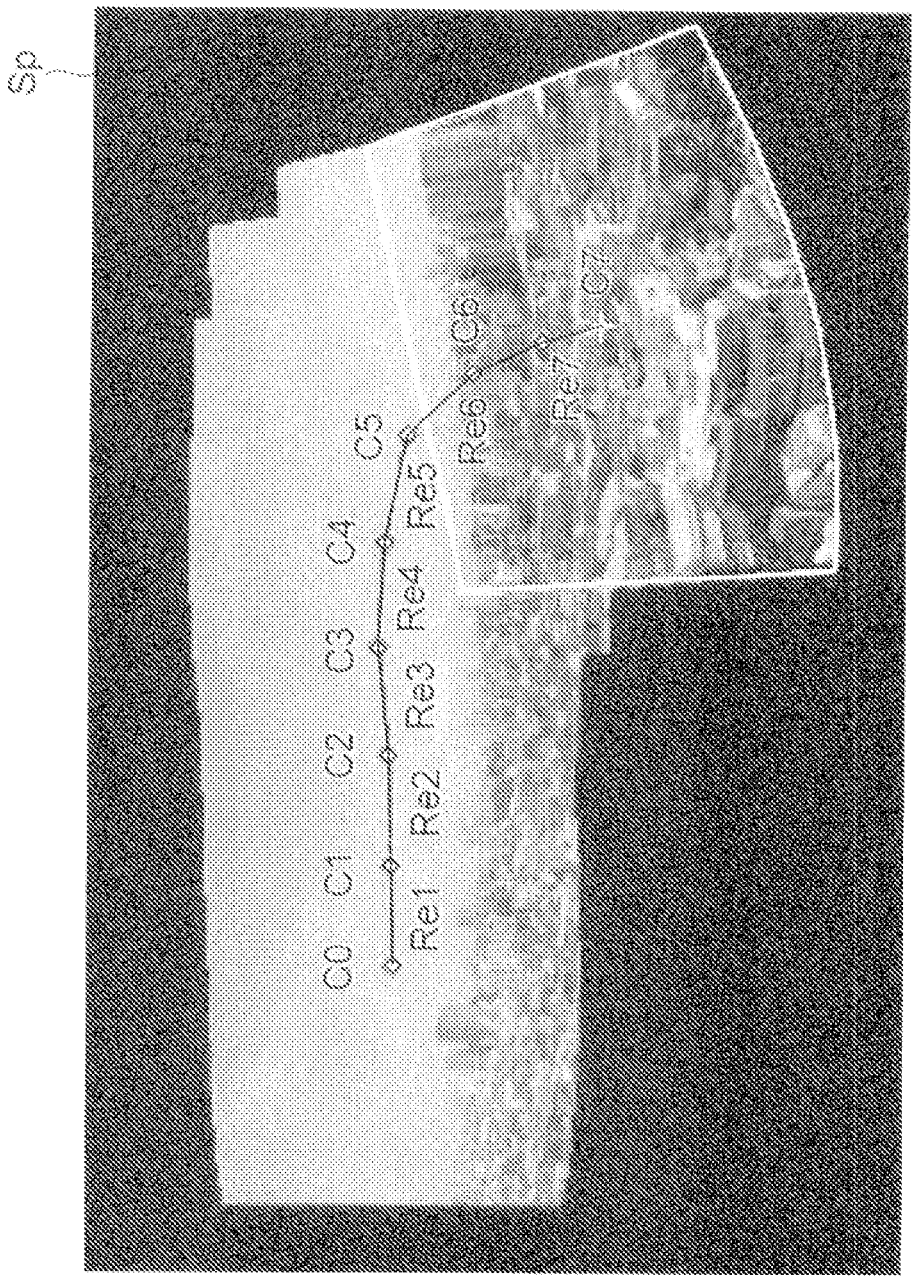
FIG. 9 is an overview diagram illustrating alignment of a plurality of images.

The estimation unit 13 estimates a transformation matrix R through the above process and performs alignment of the reference image Ir and the target image Ic. The estimation unit 13 performs successive alignment of the reference image Ir selected by the selection unit 11 and the input target image Ic to generate a link (FIG. 8(C)). FIG. 9 illustrates a link in which alignment between eight input images is performed. Centers C0 to C7 of the eight input images are linked, as illustrated in FIG. 9 (links Re1 to Re7). The operation in which the selection unit 11 selects the reference image and the estimation unit 13 forms the links is repeated, such that the images can be merged while being aligned, as illustrated in FIG. 9.

Further, since the estimation unit 13 estimates the transformation matrix R through the projection onto the spherical surface and aligns the reference image and the target image, for example, the image transformation of the eight degrees of freedom illustrated in FIG. 4 is considered upon coordinate transformation between the two-dimensional plane and the spherical surface. In other words, the estimation unit 13 performs positioning on the spherical surface such that the merging unit 14 that will be described below can perform image transformation illustrated in FIG. 4 when performing projection from the spherical surface to the plane.

Figure 10:
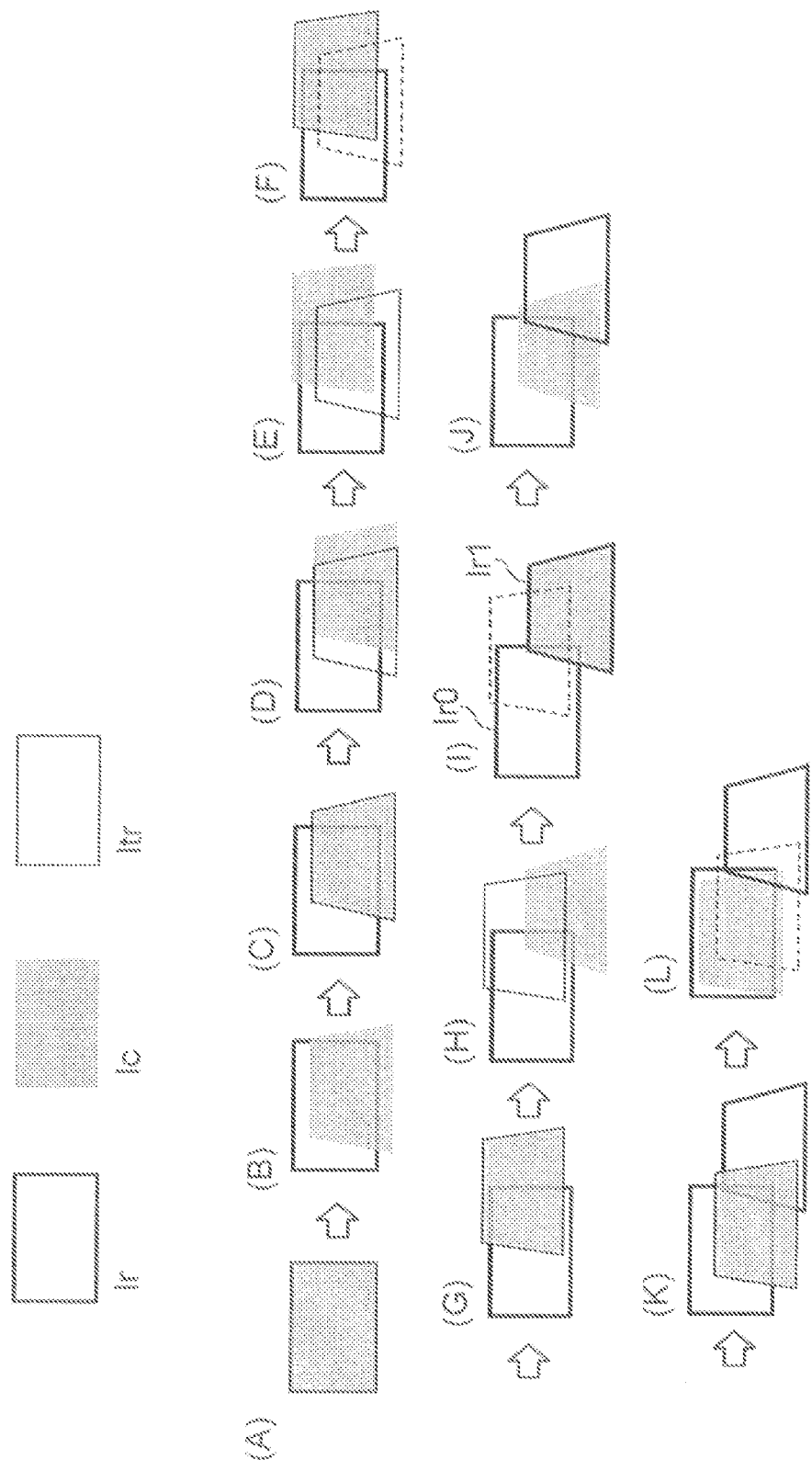
FIG. 10 is an overview diagram illustrating a selection condition for a reference image.

Hereinafter, an alternative of the selection unit 11 and the estimation unit 13 will be described. In one embodiment, the selection unit 11 may use the temporary reference image Itr as well as the reference image Ir. FIG. 10 is an overview diagram illustrating the reference image Ir and the temporary reference image Itr. First, when an image is input, the image becomes a reference image Ir for next and subsequent input, as illustrated in FIG. 10(A). A target image Ic a certain value or more apart from the reference image Ir is then input, as illustrated in FIG. 10(B). In this case, the target image Ic is used as a temporary reference image Itr being a temporary reference image for next and subsequent input, as illustrated in FIG. 10(C). The temporary reference image Itr is a temporary reference image being not stored as a history. Then, a target image Ic apart from the temporary reference image Itr is assumed to be input, as illustrated in FIG. 10(D), and a target image Ic a certain value or more apart from the temporary reference image Itr is assumed to be input, as illustrated in FIG. 10(E). In this case, the current temporary reference image Itr is discarded, and the target image Ic is used as the temporary reference image Itr being a temporary reference image for next and subsequent input, as illustrated in FIGS. 10(F) and 10(G). Then, a target image Ic a certain value or more apart from the reference image Itr as well as from the reference image Ir is input, as illustrated in FIG. 10(H). In this case, the current temporary reference image Itr is discarded and the target image Ic is used as the reference image Ir for next and subsequent input, as illustrated in FIG. 10(I). Here, the current reference image, i.e., the first reference image, is Ir0 and the reference image for next and subsequent input is Ir1. Information regarding feature points of the reference images Ir0 and In is stored for alignment. Then, a target image Ic that is also a certain value or more apart from the reference image In is input, as illustrated in FIG. 10(J). In this case, similar to FIG. 10(C), the target image Ic is used as a temporary reference image Itr being a temporary reference image for next and subsequent input, as illustrated in FIG. 10(K). Then, a target image Ic close to the reference image Ir0 relative to the temporary reference image Itr is assumed to be input, as illustrated in FIG. 10(L). In this case, the current temporary reference image Itr is discarded and the reference image for next and subsequent input is used as the reference image Ir0. Thus, the information of the reference image is held such that the target image can be aligned based on a past reference image even when the camera 20 has returned to an original position. Further, it is possible to minimize data to be recorded by using the temporary reference image Itr and the reference image Ir.

Figure 11:
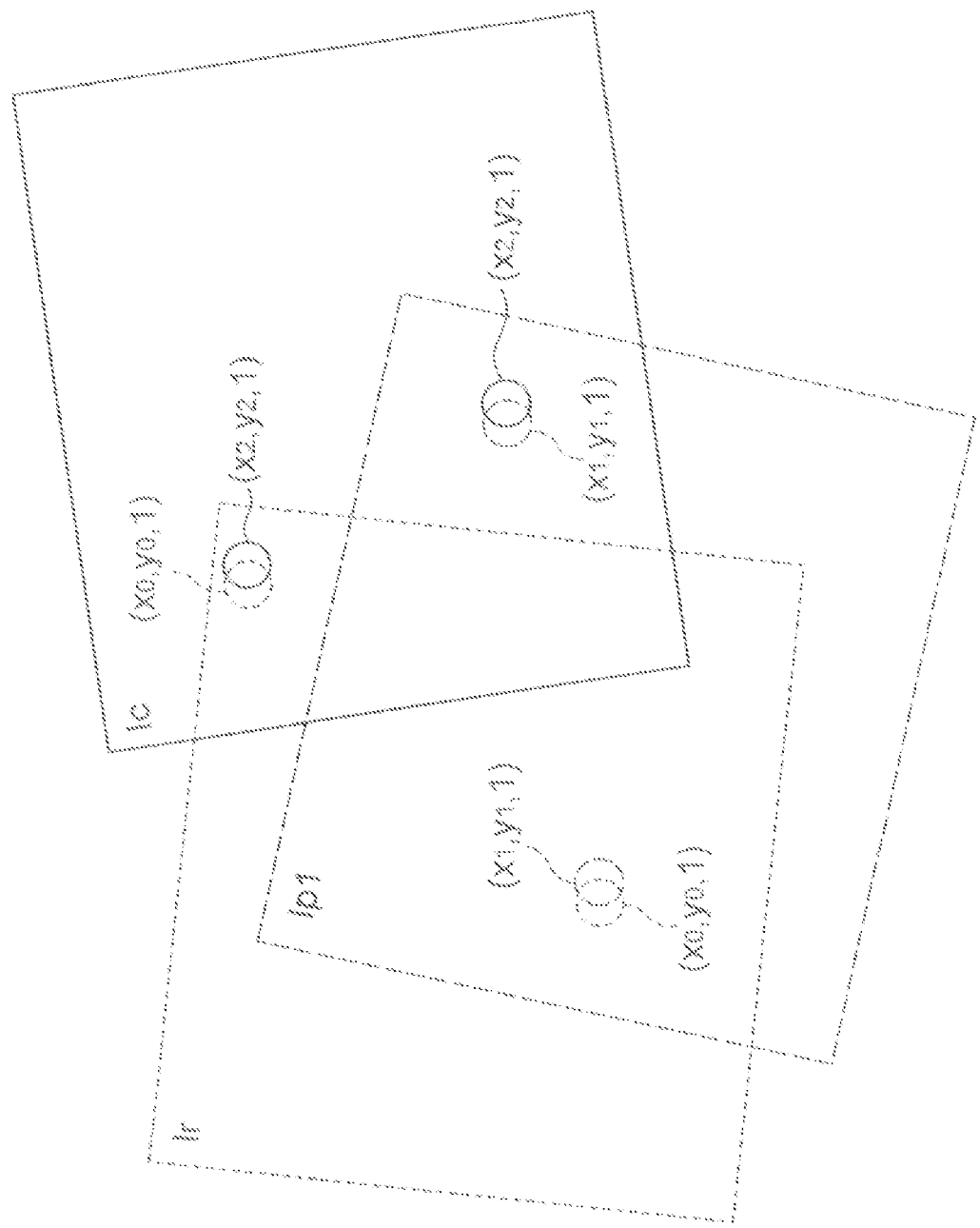
FIG. 11 is an overview diagram illustrating a case in which motions of a plurality of images are estimated at the same time.

Further, in one embodiment, when a plurality of images overlap with each other, the estimation unit 13 may estimate a motion among the plurality of images at the same time. For example, it is assumed that there is an image (past target image Ip1) overlapping with the reference image Ir and the target image Ic, as illustrated in FIG. 11. The reference image Ir and the past target image Ip1 are assumed to be positioned, i.e., the transformation matrix $R_1$ is assumed to have been already derived. Also, it is assumed that coordinates of a feature point of the reference image Ir are $(x_0, y_0, 1)$, coordinates of a feature point of the past target image Ip1 are $(x_1, y_1, 1)$, and coordinates of a feature point of the target image Ic are $(x_2, y_2, 1)$. Here, when the transformation matrix $R_2$ that causes a coordinate system of the reference image Ir to correspond to a coordinate system of the target image Ic is derived, the following condition is set.

$$\begin{pmatrix} x_0 \\ y_0 \\ z_0 \end{pmatrix} = R_1 \cdot \begin{pmatrix} x_1 \\ y_1 \\ 1 \end{pmatrix} \quad (5)$$

$$\begin{pmatrix} x_0 \\ y_0 \\ z_0 \end{pmatrix} = R_2 \cdot \begin{pmatrix} x_2 \\ y_2 \\ 1 \end{pmatrix} \quad (6)$$

$$R_1 \cdot \begin{pmatrix} x_0 \\ y_0 \\ z_0 \end{pmatrix} = R_2 \cdot \begin{pmatrix} x_2 \\ y_2 \\ 1 \end{pmatrix} \quad (7)$$

According to Equation (7), the transformation equation $R_1$ and the transformation equation $R_2$ are associated with each other. The estimation unit 13 at the same time estimates $R_1$ and $R_2$ that can satisfy Equations (5) to (7) described above using the convergence calculation based on the optimization scheme. In this case, it is possible to prevent information regarding the pair of feature points of the reference image Ir and the past target image Ip1 from being underused. Further, it is possible to suppress the accumulation of errors by performing same-time estimation among a plurality of images, in comparison with a case in which links are connected in a straight array.

Further, in one embodiment, when the target image Ic is also close to the past reference image Ir, the estimation unit 13 performs alignment with not only the current reference image Ir but also the past reference image Ir. For example, a link Re13 is established between a target image Ic13 whose image center is C13 and a reference image Ir12 whose image center is C12, and a relative position is determined, as illustrated in FIG. 13(A). Here, when the target image Ic13 is also close to the past reference image In having the image center C1 as illustrated in FIG. 13(B), the estimation unit 13 performs alignment of the reference image Ir1 and the target image Ic13. Accordingly, a link Re14 is established between the reference image Ir1 and the target image Ic13. In other words, the alignment of the reference image In and the reference image Ir12 can be performed using the target image Ic13. Thus, it is possible to perform positioning between the reference images Ir that originally have less overlap, by achieving the alignment between the reference images Ir using the target image Ic.

Further, in one embodiment, the estimation unit 13 may have a function of adjusting all positions. The adjusting all positions is to adjust a positional relationship of all images of drawing targets (the images written to the image buffer for output). For example, all positions of all drawing target images are finely adjusted at a timing at which a new link is established between the reference images Ir or at a timing at which a plurality of past transformation matrices are updated by executing same-time estimation of motions of a plurality of images. In other words, the transformation matrices R of all the drawing target images are re-calculated. For all the positions, a correspondence point between the images is extracted randomly or extracted from a predetermined position from the images based on an alignment result instead of using the feature point output by the matching unit 12, and alignment of all positions is performed based on positional information of the extracted point. In this case, since it is not necessary to hold a pair of past feature points, it is possible to reduce a memory use amount.

Next, the guide unit 15 will be described. The guide unit 15 has a function of guiding a user manipulation. The guide unit 15 is connected to the display unit 21 that displays an image, and displays a guide display on the display unit 21 to guide a camera manipulation of the user. For example, when there is a first image whose number of hops with the current reference image Ir is equal to or more than a predetermined value and which does not overlap with the current reference image Ir among a pair of a reference image Ir and a target image Ic whose relative position has been determined, the guide unit 15 displays the guide display on the display unit to guide an imaging position from a current imaging position to an image position of the first image. For example, the guide unit 15 counts the number of hops (the number of links Re) between the image (the first image) having an image center C0 and the current reference image having an image center C8, as illustrated in FIG. 13(A). Also, the guide unit 15 calculates a distance between the image having an image center C0 and the current reference image having an image center C8. Also, the guide unit 15 determines that images are merged to be in a long straight array when the count is equal to or more than a predetermined value and the distance is smaller than a predetermined value (e.g., the images do not overlap with each other). When the images are merged to be in a long straight array, it is easy for errors to be accumulated. Therefore, the guide unit 15 displays a guide display Ga so that the imaging position of the camera 20 is directed to the image (the first image) having an image center C0, as illustrated in FIG. 13(B). For the guide display Ga, a frame, an arrow or an icon may be used and a sound may be given. The user is guided by the guide display Ga and changes the imaging direction of the camera 20 such that a link can be formed between the image having an image center C0 and the image having an image center C8 and position adjustment can be performed, as illustrated in FIG. 13(C). Thus, the guide unit 15 guides the user such that the accumulation of errors can be prevented.

Figure 14:
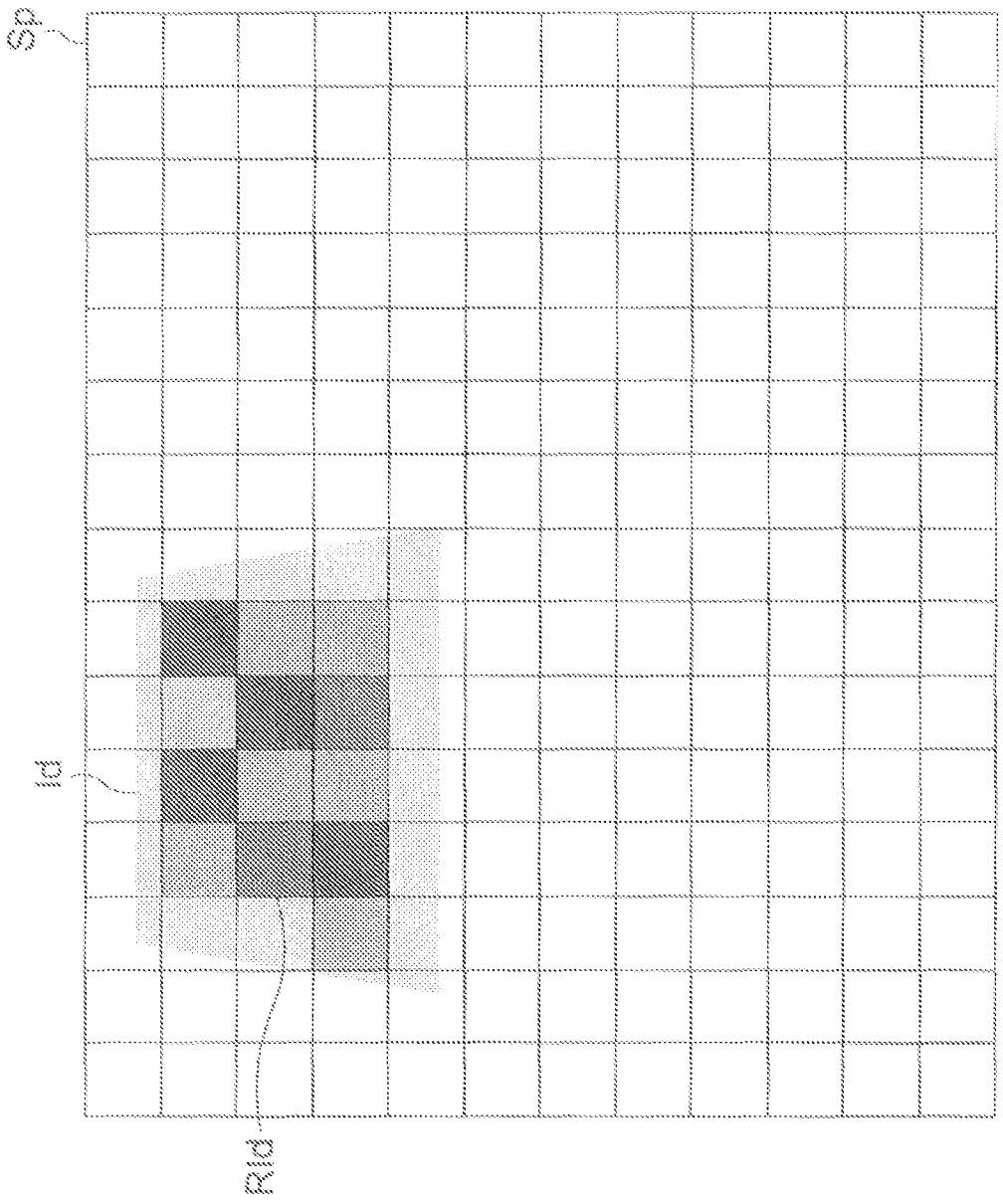
FIG. 14 is an overview diagram illustrating a composition process.

Next, the merging unit 14 will be described. The merging unit 14 is connected to the display unit 21 and has a function of drawing the composite image on the display unit 21. The merging unit 14 projects an image group (images of drawing targets) aligned on the spherical surface of the three-dimensional space through the transformation matrix estimated by the estimation unit 13 onto the two-dimensional plane. For example, the image transformation illustrated in FIG. 4 is performed at the time of the projection from the spherical surface to the plane. Also, the image of the drawing target is recorded as one composite image in a buffer for an output image. For example, the composition plane Sp is assumed to be divided in a lattice form, as illustrated in FIG. 14. The merging unit 14 draws only cells of which four corners are included in an image Id projected onto the composition plane Sp. Further, the merging unit 14 adjusts a blend ratio or the like at a border between the images. By doing so, a plurality of images Id of drawing targets are projected onto the composition plane Sp to generate the composite image.

Figure 15:
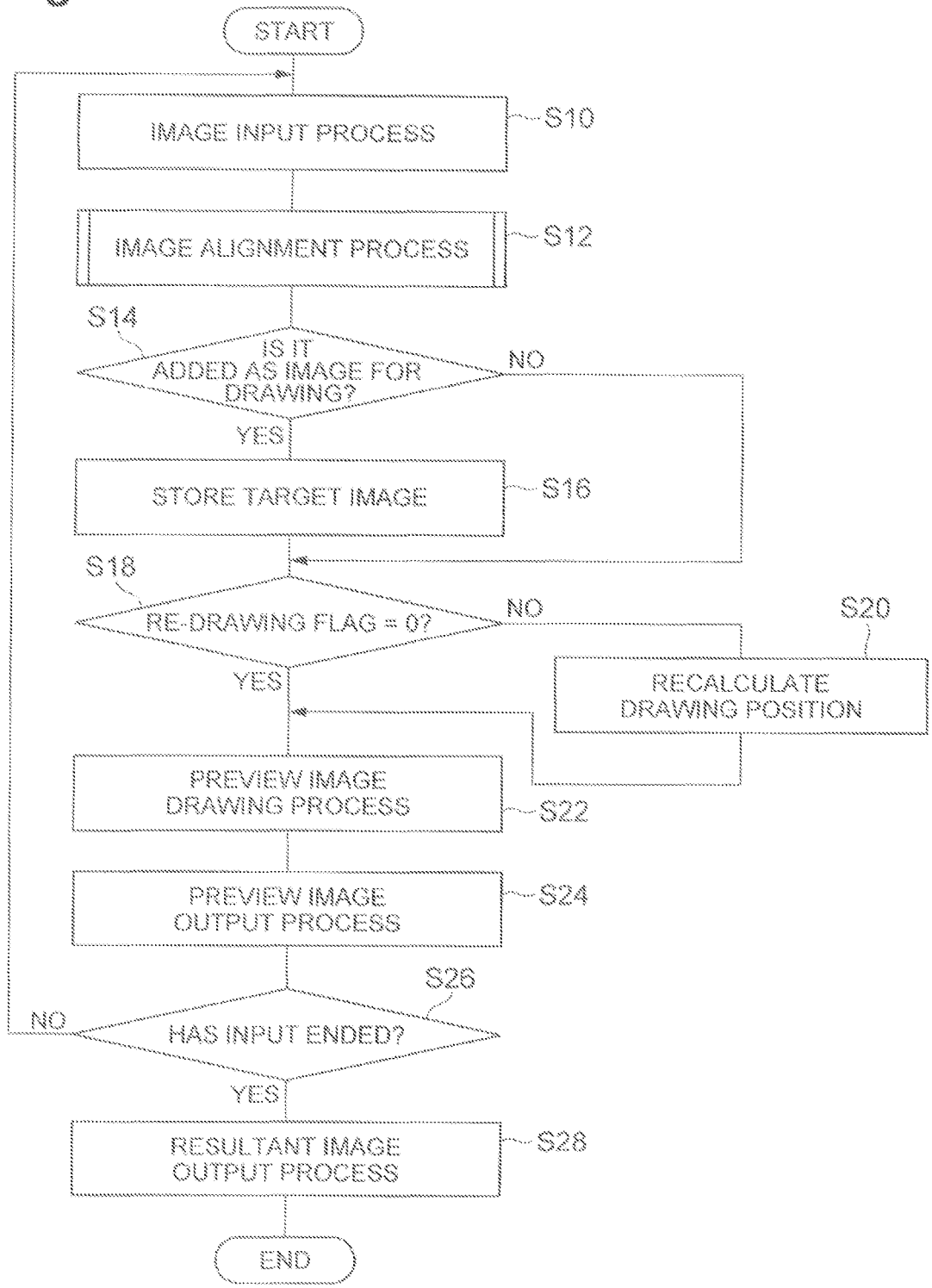
FIG. 15 is a flowchart illustrating operation of an image processing device according to an embodiment.

Next, operation of the image processing device 1 according to the present embodiment will be described. FIGS. 15 and 16 are flowcharts illustrating operation of the image processing device 1 according to the present embodiment. Control processes illustrated in FIGS. 15 and 16, for example, are executed at a timing at which the imaging function of the portable terminal 2 is turned ON and repeatedly executed at a predetermined period. Further, the target image Ic is assumed to be a second or subsequent input image in consideration of ease of understanding of explanation.

As illustrated in FIG. 15, first, the image processing device 1 executes an image input process, (S 10: input step). In the process of S10, the input unit 10 inputs a target image Ic from the camera 20. When the process of S10 ends, the process proceeds to an alignment process (S12).

In the process of S12, the selection unit 11, the matching unit 12 and the estimation unit 13 perform relative alignment of the reference image Ir and the target image Ic. Details of this process are as shown in FIG. 16. First, the selection unit 11 selects the reference image Ir from the input image (S30: selection step). The matching unit 12 and the estimation unit 13 then perform alignment of the reference image Ir and the target image Ic (S32: matching step and estimation step). The estimation unit 13 then determines whether the past (or other) reference image Ir and the target image Ic can be compared (S34). When the estimation unit 13 determines in the process of S34 that the images can be compared, the estimation unit 13 performs alignment of the past reference image Ir and the target image Ic (S36; e.g., FIG. 12(B)). Also, the estimation unit 13 sets a re-drawing flag to 1 for adjustment of all positions (S38). The selection unit 11 then determines whether a distance between the target image Ic and the past reference image Ir is equal to or more than a predetermined value (S40). When the selection unit 11 determines in the process of S40 that the distance is equal to or more than the predetermined value, the target image Ic is recorded in a reference image list to be a reference image Ir for next or subsequent input (S42). The reference image list refers to a list enabling data in which a pixel value and coordinates of a feature point of the reference image have been recorded to be referred to. When the process of S42 ends, the alignment process illustrated in FIG. 16 ends.

On the other hand, when the estimation unit 13 determines in the process of S34 that the images cannot be compared, the process proceeds to the process of determining the distance between the target image Ic and the past reference image Ir (S40). On the other hand, when the selection unit 11 determines in the process of S40 that the distance is not equal to or more than the predetermined value, the alignment process illustrated in FIG. 16 ends.

Referring back to FIG. 15, when the process of S12 ends, the process proceeds to a determination process (S14).

In the process of S14, the merging unit 14 determines whether the target image Ic input in the process of S10 is added as an image for drawing. For example, the merging unit 14 is configured to be able to refer to a drawing image list enabling image information of an image to be drawn to be referred to, and adds the target image Ic input in the process of S10 as the image for drawing when a distance up to the closest image among images described on the list is equal to or more than a predetermined value. When the addition is determined in the process of S14, the process proceeds to a storing process (S16).

In the process of S16, the merging unit 14 adds the target image Ic to the drawing list and stores the target image Ic. When the process of S16 ends, the process proceeds to a re-drawing determination process (S18).

In the process of S18, the estimation unit 13 determines whether a re-drawing flag=0. When the re-drawing flag=1 in the process of S18, the process proceeds to a process of recalculating a drawing position (S20).

In the process of S20, the estimation unit 13 performs an all-position alignment process. The estimation unit 13 adjusts positions of all images for drawing using an updated transformation matrix. When the process of S20 ends, the process proceeds to a preview image drawing process (S22).

In the process of S22, the merging unit 14, for example, identifies an image to be drawn from the drawing image list and performs projection from the spherical surface of the three-dimensional space to the two-dimensional plane to generate a composite image for preview (S22: merging step). The image for preview is then output and displayed on the display unit 21 or the like (S24). When the process of S24 ends, the process proceeds to the process of determining image input (S26).

On the other hand, when the merging unit 14 does not determine the addition in the process of S14, the process proceeds to the re-drawing determination process (S18). Further, when the re-drawing flag=0 in the process of S18, the process proceeds to the preview image drawing process (S22).

In the process of S26, the input unit 10 determines whether the input of the image Ic ends. When the input of the target image Ic does not end in the process of S26, the process proceeds to the process of S10 again. On the other hand, when the input of the target image Ic ends, the process proceeds to a resultant image output process (S28).

In the process of S28, the merging unit 14 displays the composite image on the display unit 21 or the like. Thus, the control process illustrated in FIGS. 15 and 16 ends. It is possible to obtain a high quality panoramic composite image while preventing accumulation of errors by executing the control processes illustrated in FIGS. 15 and 16.

Next, an image processing program for causing the portable terminal (computer) 2 to function as the image processing device 1 will be described.

The image processing program includes a main module, an input module and a calculation processing module. The main module is a part that controls overall image processing. The input module operates the portable terminal 2 to acquire input images. The calculation processing module includes a selection module, a matching module, an estimation module, a composition module and a guide module.

Functions realized by executing the main module, the input module and the calculation processing module are the same as the functions of the input unit 10, the selection unit 11, the matching unit 12, the estimation unit 13, the merging unit 14 and the guide unit 15 of the image processing device 1 described above, respectively.

The image processing program, for example, is provided by a recording medium or a semiconductor memory, such as a ROM. Further, the image processing program may be provided as a data signal through a network.

According to the image processing device 1, the image processing method and the image processing program according to the present embodiment, a motion between the reference image Ir and the target image Ic is regarded to be caused by only rotational motion of the camera 20, and the transformation matrix R that causes the coordinate systems of both of the images to correspond to each other is estimated.

Therefore, since parameters of expansion, reduction, translation and the like are not included in the transformation matrix R, it is possible to prevent the input target image Ic from being, for example, reduced and errors from being generated. Further, since it is possible to prevent the target image Ic, for example, that has been reduced from being the reference image Ir for next and subsequent input through limiting to only a rotational component, it is possible to prevent accumulation of errors. Thus, when the input images are sequentially merged, it is possible to suppress the accumulation of errors and obtain a high quality panoramic image even when images having different imaging orientations are included.

Further, the embodiment described above shows an example of the image processing device according to the present invention. The image processing device according to the present invention is not limited to the image processing device 1 according to the embodiment, and the image processing device according to the embodiment may be changed or may be applied to other devices without departing from the gist defined in each claim.

For example, while the example in which the camera 20 continuously captures a still image has been described in the embodiment described above, the camera 20 may capture a moving image. In this case, the input unit 10 may have a function of extracting continuous images from the captured moving image. Further, the image input by the input unit 10 may be an image transmitted from another device through a network.

Further, while sizes of the images captured by the camera 20 have been described to be the same in the embodiment described above, the sizes of the captured images may be sizes different at every imaging.

Further, while the case in which the input unit 10, the selection unit 11, the matching unit 12, the estimation unit 13, the merging unit 14 and the guide unit 15 are included has been described in the embodiment described above, the configuration may be appropriately changed according to required performance. For example, the guide unit 15 may not be included, as necessary.

Further, while the case in which the image is deformed at the eight degrees of freedom illustrated in FIG. 5 has been described in the embodiment described above, the present invention is not limited to the eight degrees of freedom and, for example, six degrees of freedom illustrated in FIGS. 5(A) to (F) may be used.

DESCRIPTION OF REFERENCE NUMERALS

1 . . . Image processing device, 10 . . . Input unit, 11 . . . Selection unit, 12 . . . Matching unit, 13 . . . Estimation unit, 14 . . . Merging unit, 15 . . . Guide unit, 20 . . . Camera, 21 . . . Display unit

The invention claimed is:

1. An image processing device that sequentially inputs an image captured by an imaging element and generates a composite image by merging images, the image processing device comprising:

a processor; and memory storing executable instructions that, when executed by the processor, causes the processor to perform as:

an input unit that sequentially inputs the images;

a selection unit that selects a reference image from among the input images including one or a plurality of images input by the input unit prior to a target image that is a processing target being newly input by the input unit;

an estimation unit that estimates a transformation equation that causes a coordinate system of the reference image to correspond to a coordinate system of the target image;

a merging unit that merges the reference image with the target image to generate the composite image based on the transformation equation; and a guide unit connected to a display unit that displays an image, wherein the guide unit displays a guide display on the display unit to induce a camera manipulation by a user, wherein when a distance between the reference image and the target image is equal to or more than a predetermined value, the selection unit selects the target image as a temporary reference image for the target image that is subsequently input by the input unit, wherein when the target image a predetermined value or more apart from the temporary reference image is input, the selection unit discards a current temporary reference image and selects the target image as the temporary reference image for the target image that is subsequently input by the input unit, wherein when the target image a predetermined value or more apart from the temporary reference image as well as from the reference image is input, the selection unit discards the current temporary reference image and selects the target image as the reference image for the target image that is subsequently input by the input unit, wherein the reference image is stored as a history and the temporary reference image is not stored as the history, and wherein the estimation unit links the reference image and the target image that are used for estimating the transformation equation and records the reference image and the target image as a pair whose relative position has been determined, when there is a first image whose number of hops with a current reference image is equal to or higher than a predetermined value and which does not overlap with the current reference image among the pair whose relative position has been determined, the guide unit displays the guide display on the display unit to guide an imaging position so that a current imaging position being positioned away from the first image and not overlapping with the first image, is subsequently directed towards the first image, and subsequently back over the first image.

2. The image processing device according to claim 1, wherein when a distance between the target image and a past reference image is smaller than the distance between the target image and the reference image, the selection unit selects the past reference image as the reference image for the target image that is the processing target being a next or subsequent image newly input.

3. The image processing device according to claim 2, further comprising a matching unit that calculates a correspondence relationship between a feature point of the reference image and a feature point of the target image, and calculates a correspondence relationship between the feature point of the past reference image and the feature point of the target image when the distance between the target image and the past reference image is equal to or less than a predetermined value, wherein the estimation unit:
further estimates the transformation equation that causes the coordinate system of the past reference image to correspond to the coordinate system of the target image using positional information of the pair of the feature points of the past reference image and the target image, and causes the reference image to correspond to the past reference image using the transformation equation that causes the coordinate system of the reference image to correspond to the coordinate system of the target image and the transformation equation that causes the coordinate system of the past reference image to correspond to the coordinate system of the target image.

4. An image processing method that sequentially inputs an image captured by an imaging element and generates a composite image by merging images, the image processing method comprising:

sequentially inputting the images;
selecting a reference image from among input images including one or a plurality of images sequentially input prior to a target image that is a processing target being newly input when sequentially input;
estimating a transformation equation that causes a coordinate system of the reference image to correspond to a coordinate system of the target image; and
merging the reference image with the target image to generate the composite image based on the transformation equation,
displaying a guide display on a display unit to induce a camera manipulation by a user,
wherein when a distance between the reference image and the target image is equal to or more than a predetermined value, the selecting includes selecting the target image as a temporary reference image for the target image that is subsequently input,
wherein when the target image a predetermined value or more apart from the temporary reference image is input, discarding a current temporary reference image and selecting the target image as the temporary reference image for the target image that is subsequently input,
wherein when the target image a predetermined value or more apart from the temporary reference image as well as from the reference image is input, discarding the current temporary reference image and selecting the target image as the reference image for the target image that is subsequently input, wherein the reference image is stored as a history and the temporary reference image is not stored as the history,
wherein the estimating includes linking the reference image and the target image that are used for estimating the transformation equation and a recording the reference image and the target image as a pair whose relative position has been determined, and
when there is a first image whose number of hops with a current reference image is equal to or higher than a predetermined value and which does not overlap with the current reference image among the pair whose relative position has been determined, the displaying includes displaying the guide display on the display unit to guide an imaging position so that a current imaging position being positioned away from the first image and not overlapping with the first image, is subsequently directed towards the first image, and subsequently back over the first image.

5. A non-transitory computer-readable recording medium having an image processing program recorded thereon for causing a computer to function to sequentially input an image captured by an imaging element and generate a composite image by merging images, wherein the image processing program causes the computer to function as:

an input unit that sequentially inputs the images;
a selection unit that selects a reference image from among the input images including one or a plurality of images input by the input unit prior to a target image that is a processing target being newly input by the input unit;
an estimation unit that estimates a transformation equation that causes a coordinate system of the reference image to correspond to a coordinate system of the target image; and
a merging unit that merges the reference image with the target image to generate the composite image based on the transformation equation; and
a guide unit connected to a display unit that displays an image, wherein the guide unit displays is a guide display on the display unit to induce a camera manipulation by a user,
wherein when a distance between the reference image and the target image is equal to or more than a predetermined value, the selection unit selects the target image as a temporary reference image for the target image that is subsequently input by the input unit,
wherein when the target image a predetermined value or more apart from the temporary reference image is input, the selection unit discards a current temporary reference image and selects the target image as the temporary reference image for the target image that is subsequently input by the input unit,
wherein when the target image a predetermined value or more apart from the temporary reference image as well as from the reference image is input, the selection unit discards the current temporary reference image and selects the target image as the reference image for the target image that is subsequently input by the input unit,
wherein the reference image is stored as a history and the temporary reference image is not stored as the history,
wherein the estimation unit links the reference image and the target image that are used for estimating the transformation equation and records the reference image and the target image as a pair whose relative position has been determined, when there is a first image whose number of hops with a current reference image is equal to or higher than a predetermined value and which does not overlap with the current reference image among the pair whose relative position has been determined, the guide unit displays the guide display on the display unit to guide an imaging position so that a current imaging position being positioned away from the first image is subsequently directed towards the first image and not overlapping with the first image, and subsequently back over the first image.

6. An image processing device that sequentially inputs an image captured by an imaging element and generates a composite image by merging images, the image processing device comprising;

a processor; and memory storing executable instructions that, when executed by the processor, causes the processor to perform as:

an input unit that sequentially inputs the images;

a selection unit that selects a reference image from among the input images including one or a plurality of images input by the input unit prior to a target image that is a processing target being newly input by the input unit;

an estimation unit that estimates a transformation equation that causes a coordinate system of the reference image to correspond to a coordinate system of the target image;

a merging unit that merges the reference image with the target image to generate the composite image based on the transformation equation; and a guide unit connected to a display unit that displays an image, wherein the guide unit displays a guide display on the display unit to induce a camera manipulation by a user, wherein the estimation unit links the reference image and the target image that are used for estimating the transformation equation and records the reference image and the target image as a pair whose relative position has been determined, the merging unit displays the composite image on the display unit, and when there is a first image whose number of hops with a current reference image is equal to or higher than a predetermined value and which does not overlap with the current reference image among the pair whose relative position has been determined, the guide unit displays the guide display on the display unit to guide an imaging position so that a current imaging position being positioned away from the first image and not overlapping with the first image, is subsequently directed towards the first image, and subsequently back over the first image.

7. An image processing method that sequentially inputs an image captured by an imaging element and generates a composite image by merging images, the image processing method comprising:

sequentially inputting the images;

selecting a reference image from among input images including one or a plurality of images sequentially input prior to a target image that is a processing target being newly input when sequentially input;

estimating a transformation equation that causes a coordinate system of the reference image to correspond to a coordinate system of the target image;

merging the reference image with the target image to generate the composite image based on the transformation equation; and displaying a guide display on a display unit to induce a camera manipulation by a user, wherein the estimating includes linking the reference image and the target image that are used for estimating the transformation equation and recording the reference image and the target image as a pair whose relative position has been determined, the merging includes displaying the composite image on the display unit, and when there is a first image whose number of hops with a current reference image is equal to or higher than a predetermined value and which does not overlap with the current reference image among the pair whose relative position has been determined, the displaying includes displaying the guide display on the display unit to guide an imaging position so that a current imaging position being positioned away from the first image and not overlapping with the first image, is subsequently directed towards the first image, and subsequently back over the first image.

8. A non-transitory computer-readable recording medium having an image processing program recorded thereon for causing a computer to function to sequentially input an image captured by an imaging element and generate a composite image by merging images at input timing, wherein the image processing program causes the computer to function as:

an input unit that sequentially inputs the images;

a selection unit that selects a reference image from among the input images including one or a plurality of images input by the input unit prior to a target image that is a processing target being newly input by the input unit;

an estimation unit that estimates a transformation equation that causes a coordinate system of the reference image to correspond to a coordinate system of the target image;

a merging unit that merges the reference image with the target image to generate the composite image based on the transformation equation; and a guide unit connected to a display unit that displays an image, wherein the guide unit displays a guide display on the display unit to induce a camera manipulation by a user, wherein the estimation unit links the reference image and the target image that are used for estimating the transformation equation and records the reference image and the target image as a pair whose relative position has been determined, the merging unit displays the composite image on the display unit, and when there is a first image whose number of hops with a current reference image is equal to or higher than a predetermined value and which does not overlap with the current reference image among the pair whose relative position has been determined, the guide unit displays the guide display on the display unit to guide an imaging position so that a current imaging position being positioned away from the first image is subsequently directed towards the first image and not overlapping with the first image, and subsequently back over the first image.

* * * * *